US012811478B2

(12) United States Patent
Russell et al.

(10) Patent No.: US 12,811,478 B2
(45) Date of Patent: Nov. 24, 2026

(54) STATOR CONSTRUCTION FOR WIND TURBINE GENERATORS

(71) Applicant: Timken Gears & Services Inc., King of Prussia, PA (US)

(72) Inventors: Randall W. Russell, Kennewick, WA (US); Jan H. de Swardt, Eustis, FL (US); Luke D. Koljonen, North Canton, OH (US); James G. Wilson, Prosser, WA (US); Nathaniel Z.N. Glessner, Pasco, WA (US)

(73) Assignee: Timken Gears & Services Inc., King of Prussia, PA (US)

( * ) Notice: Subject to any disclaimer, the term of this patent is extended or adjusted under 35 U.S.C. 154(b) by 0 days.

(21) Appl. No.: 19/080,567

(22) Filed: Mar. 14, 2025

(65) Prior Publication Data

US 2026/0095081 A1 Apr. 2, 2026

Related U.S. Application Data

(60) Provisional application No. 63/701,955, filed on Oct. 1, 2024.

(51) Int. Cl.
*H02K 15/50* (2025.01)
*H02K 3/28* (2006.01)
(Continued)

(52) U.S. Cl.
CPC ............... *H02K 15/50* (2025.01); *H02K 3/28* (2013.01); *H02K 3/345* (2013.01); *H02K 7/04* (2013.01);
(Continued)

(58) Field of Classification Search
CPC .......... H02K 15/50; H02K 3/28; H02K 3/345; H02K 7/04; H02K 7/183; H02K 15/023;
(Continued)

(56) References Cited

U.S. PATENT DOCUMENTS

| | | | | |
|---|---|---|---|---|
| 2014/0230235 A1* | 8/2014 | Allen | H02K 15/50 29/762 |
| 2022/0069677 A1* | 3/2022 | Palmer | H02K 5/225 |
| 2023/0307980 A1* | 9/2023 | Wyderski | H02K 5/203 |

OTHER PUBLICATIONS

Vestas, "Vestas V47," <https://en.wind-turbine-models.com/turbines/13-vestas-v47> web page visited Sep. 6, 2024 (6 pages).
(Continued)

*Primary Examiner* — Joseph Ortega
(74) *Attorney, Agent, or Firm* — Michael Best & Friedrich LLP

(57) ABSTRACT

Rotors and stators for use in electric machines and methods for refurbishing the same. One method for refurbishing a stator for use in an electric machine includes at least partially disassembling the stator to provide access to a plurality of stator windings connected in a four-circuit delta connection having three and four turns per coil, and reconfiguring the stator such that the plurality of stator windings are connected in an eight-circuit delta connection having seven turns per coil. One method for refurbishing a rotor for use in an electric machine includes at least partially disassembling the rotor to provide access to a rotor core, the rotor core including first rotor bars, and reconfiguring the rotor core to include second rotor bars that are longer than the first rotor bars.

10 Claims, 24 Drawing Sheets

(51) Int. Cl.
*H02K 3/34* (2006.01)
*H02K 7/04* (2006.01)
*H02K 7/18* (2006.01)
*H02K 15/023* (2025.01)
*H02K 15/165* (2025.01)
*H02K 15/35* (2025.01)
*H02K 17/42* (2006.01)

(52) U.S. Cl.
CPC ........... *H02K 7/183* (2013.01); *H02K 15/023* (2025.01); *H02K 15/165* (2013.01); *H02K 15/35* (2025.01); *H02K 17/42* (2013.01); *F05B 2230/80* (2013.01)

(58) Field of Classification Search
CPC ...... H02K 15/165; H02K 15/35; H02K 17/42; H02K 7/1838; F05B 2230/80
See application file for complete search history.

(56) References Cited

OTHER PUBLICATIONS

Leroy Somer, "FLSB—FLSLB slip ring totally enclosed three-phase asynchronous motors," <https://vecgroup.com/assets/pdf/katalog-elektrodvigateli-leroy-somer-s-faznym-rotorom-serii-flsb-flslb.pdf> web page visited Apr. 3, 2025 (16 pages).

* cited by examiner

STATOR CONSTRUCTION FOR WIND TURBINE GENERATORS

CROSS-REFERENCE TO RELATED APPLICATIONS

This application claims priority to U.S. Provisional Patent Application No. 63/701,955, filed on Oct. 1, 2024, the entire contents of which are incorporated by reference herein.

SUMMARY

Generators, such as Doubly Fed Induction Generators (DFIG) wind generators experience rotor and/or stator failures that result in needing replacement of the rotor and/or stator. The mean time between failures (MTBF) is typically less than seven years, while the end user's expectation for mean time between failures are more than 10 years. Accordingly, there is a need to replace DFIG wind generator components with upgraded components that can extend the mean time between failures.

Embodiments described herein relate to upgrading original wind generator rotors and stators with new rotors and stators less prone to failures. Rotors and stators described herein generally relate to high-powered generators, such as power ratings ranging from 600 to 800 kW (for example, 660 kW) and voltage ratings ranging from 525 to 700 V (for example, 690 V). Generators described herein may have a frequency of either 50 Hz or 60 Hz and a synchronous speed range between 1000 and 2000 rpm (for example 1812 rpm at 60 Hz or 1511 rpm at 50 Hz). Once failed, the generator can be taken out of service and either replaced by a new original equipment unit (which still contain the original cause of premature failure) or advantageously refurbished at a lower cost than a full replacement with a design upgrade that address the cause for premature failure. It would be possible to incorporate these design upgrades into the design of a new, improved Original Equipment Manufacturer (OEM) design to be used to manufacture new generators.

Since these causes of failures may also be experienced in electric motors stators (for squirrel cage induction, synchronous and wound rotor asynchronous), and/or rotors (for wound rotor asynchronous), the described improvements can be implemented both on electric motors and generators. Collectively these will be referred to "machines," which should be understood to include both motors and generators.

One example provides a method for refurbishing a stator for use in an electric machine, the method comprising at least partially disassembling the stator to provide access to a plurality of stator windings connected and reconfiguring the stator such that the plurality of stator windings are connected in a four-circuit delta connection having three and four turns per coil. The plurality of stator windings consists of only conductors that are insulated with quad film.

In some aspects, reconfiguring the stator includes adjusting the conductor size such that a slot fill factor includes a total conductor area of between 43% to 49% of the available slot size. In some aspects, the method includes reconfiguring the stator such that the plurality of stator windings are connected in an eight-circuit delta connection having seven turns per coil.

In some aspects, the plurality of stator windings are fully annealed copper windings. In some aspects, the plurality of stator windings are situated in stator slots lined with an aramid paper, polyimide film, aramid paper composite slot liner In some aspects, each coil end of the plurality of stator windings on the overhang portion is taped with porous glass cloth or tape during refurbishing of the stator. In some aspects, the plurality of stator windings are wound with phase-to-phase separators, using an electrical insulation material.

In some aspects, the electrical insulation material includes polyester coated closed weave fabric. In some aspects, the electrical insulation material includes aramid paper. In some aspects, the electrical insulation material includes composites of aramid and polyimide film. In some aspects, the stator includes 96 stator slots.

Another example provides a method for refurbishing a rotor for use in an electric machine, the method comprising at least partially disassembling the rotor to provide access to a rotor core, the rotor core including first rotor bars extending towards a fan, the first rotor bars and the fan being separated by a gap, and reconfiguring the rotor core to include second rotor bars that are longer than the first rotor bars.

In some aspects, the air gap between the end of the bars and the fan is between 0.3 and 0.5 inches. In some aspects, the method includes cutting the second rotor bars using a grinding disk prior to reconfiguring the rotor core to include the second rotor bars.

Another example provides a method for refurbishing a rotor for use in an electric machine, the method comprising at least partially disassembling the rotor to provide access to a rotor core, fitting rotor bars into the rotor core, and wrapping an overhang portion of the rotor core using a woven glass mat around the circumference of the rotor, the woven glass mat including a radially projecting end flange.

In some aspects, wrapping the overhang portion of the rotor core includes wrapping at least 90 layers of banding tape around the woven glass mat. In some aspects, the woven glass mat extends to between 16/64 and 4/64 of an inch of the end of the rotor bars.

Another example provides a method for refurbishing a rotor for use in an electric machine. The method includes removing a balancing disk from the rotor, the rotor including a plurality of tabs, removing the plurality of tabs from the balancing disk, and replacing the balancing disk onto the rotor.

In some aspects, removing the plurality of tabs from the balancing disk includes grinding the plurality of tabs. In some aspects, removing the tabs from the balancing disk includes cutting off a radially outer perimeter portion of the balancing disk.

Another example provides a rotor for an electric machine, the rotor comprising a plurality of rotor slots, each rotor slot configured to receive a plurality of rotor bars. The plurality of rotor bars include a first pair of rotor bars and a second pair of rotor bars. The rotor bars in each pair of rotor bars have a different cross section profile and the pairs of rotor bars are staggered.

In some aspects, the plurality of rotor bars includes a third pair of rotor bars. In some aspects, the plurality of rotor bars are copper bars. In some aspects, the plurality of rotor slots are semi-closed. In some aspects, the plurality of rotor bars are split with a minimum overlap of at least 1/8 inch. In some aspects, the plurality of rotor slots includes 84 slots.

Another example provides a method for refurbishing a rotor for use in an electric machine. The method includes at least partially disassembling the rotor to provide access to a rotor core, the rotor core including rotor bars manufactured from an electrically conductive material.

In some aspects, the plurality of rotor windings are high conductivity copper windings. In some aspects, the rotor bars are insulated from the rotor core with an insulation material of composites of aramid and polyimide film. In some aspects, the thickness of the insulation material is at least 10 mil. In some aspects, the rotor includes 84 rotor slots.

In some aspects, the method includes reconfiguring pairs of the rotor bars such that each pair of rotor bars have a different cross section profile, wherein the pairs of rotor bars are staggered. In some aspects, the method includes providing the rotor with a tab-less balancing disk. In some aspects, the method includes wrapping an overhang portion of the rotor core using a woven glass mat around the circumference of the rotor, the woven glass mat including a radially projecting end flange.

Another example provides a generator comprising stator including a plurality of stator windings consisting of conductors that are insulated with quad film. The conductors are situated in stator slots and fill between 43% to 49% of an available slot size of the stator slots.

In some aspects, the plurality of stator windings are connected in an eight-circuit delta connection having seven turns per coil. In some aspects, each coil end of the plurality of stator windings on the overhang portion is taped with porous glass cloth or tape.

Other aspects of the invention will become apparent by consideration of the detailed description and accompanying drawings.

Figure 1:
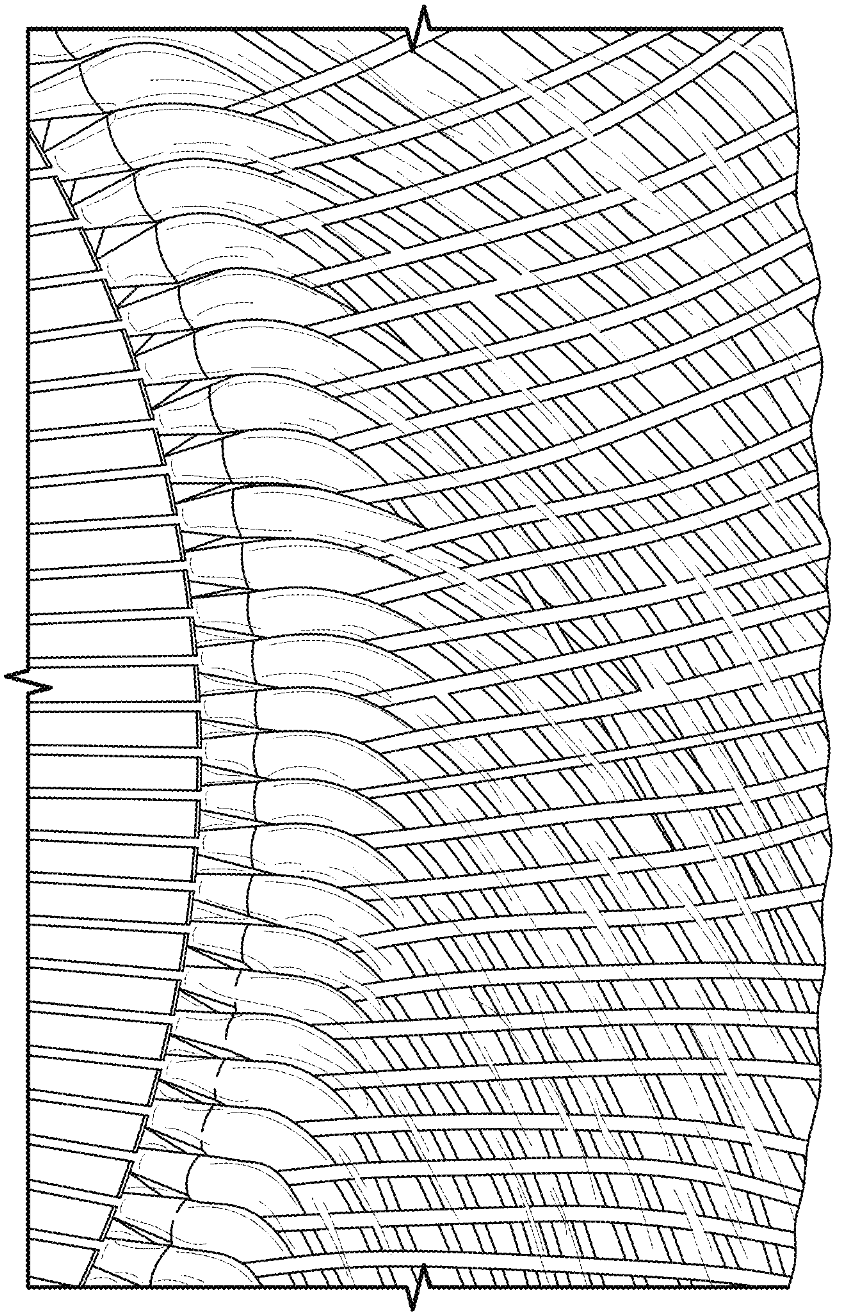
FIG. 1 illustrates an overhang section of an overheated stator of an original machine.

Other aspects of the embodiments described herein will become apparent by consideration of the detailed description.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Stators described herein may be implemented in a wind turbine generator that has respective power and voltage ratings of 660 kilowatts (kW) and 690 volts (V). However, it should be understood that description herein of the flaws and proposed improvements to the design of the original stator may also be applicable to stator designs implemented in wind turbine generators having other electrical ratings. For example, the designs and methods for constructing, installing, and/or refurbishing wound rotors described herein may also be applicable to generators/motors rated to 600-800 KW, 525-700V, 50-60 Hertz (Hz), and a synchronous speed of 1000-2000 rotations per minute (rpm). In some instances, the designs and methods for constructing, installing, and/or refurbishing stators described herein are applicable to generators/motors with different electrical ratings not explicitly described herein.

As will be described in more detail below, failure of one or more of the components included in the original machine may be attributed to deficiencies in the designs, methods, and/or materials used to construct, install, and/or refurbish the original machine. As one example, current stator slot liner and insulation is unsatisfactory, as stators experience damage from high voltage and temperatures. As another example, rotors experience overheating damage due to poor air circulation and collapsing of rotor bars.

Table 1 provides a modelled performance of a wind turbine generator implementing an original stator, including eddy and circulating current losses resulting from the specific design parameters of the original stator.

TABLE 1

Modelled Performance of Original Machine Design

| Description | | | Original Design | Unit |
|---|---|---|---|---|
| Winding Configuration | | Turns per coil | 3 & 4 | turns |
| | | Conductors | 11x AWG 16 and 17x AWG 17 | |
| Output Power | | | 660 | kW |
| Losses at Full Load | Stator | Conductor $I^2R$ | 4.707 | kW |
| | | Additional Eddy and Circulating Current Losses | 6% 0.267 | kW |
| | | Total | 4.974 | kW |

Additionally, Table 2 provides modelled flux densities of a wind turbine generator implementing the original stator and rotor.

TABLE 2

Modelled Flux Densities of Original Machine Design

| Description | | Original Design | Unit |
|---|---|---|---|
| Stator | Core | 1.348 | T |
| | | 86993 | lines/in$^2$ |
| | Teeth | 1.218 | T |
| | | 78548 | lines/in$^2$ |

TABLE 2-continued

Modelled Flux Densities of Original Machine Design

| Description | | Original Design | Unit |
|---|---|---|---|
| Rotor | Core | 0.752 | T |
| | | 48529 | lines/in$^2$ |
| | Teeth | 1.112 | T |
| | | 71748 | lines/in$^2$ |

Typically, wind turbine generators of this size can achieve flux densities up to 1.6 T (or 103226 lines/in$^2$). Embodiments described herein replace components of original stators and rotors that may have experienced failure with new components or in new configurations that reduce total losses and change flux density.

Stator Replacement

Figure 2:
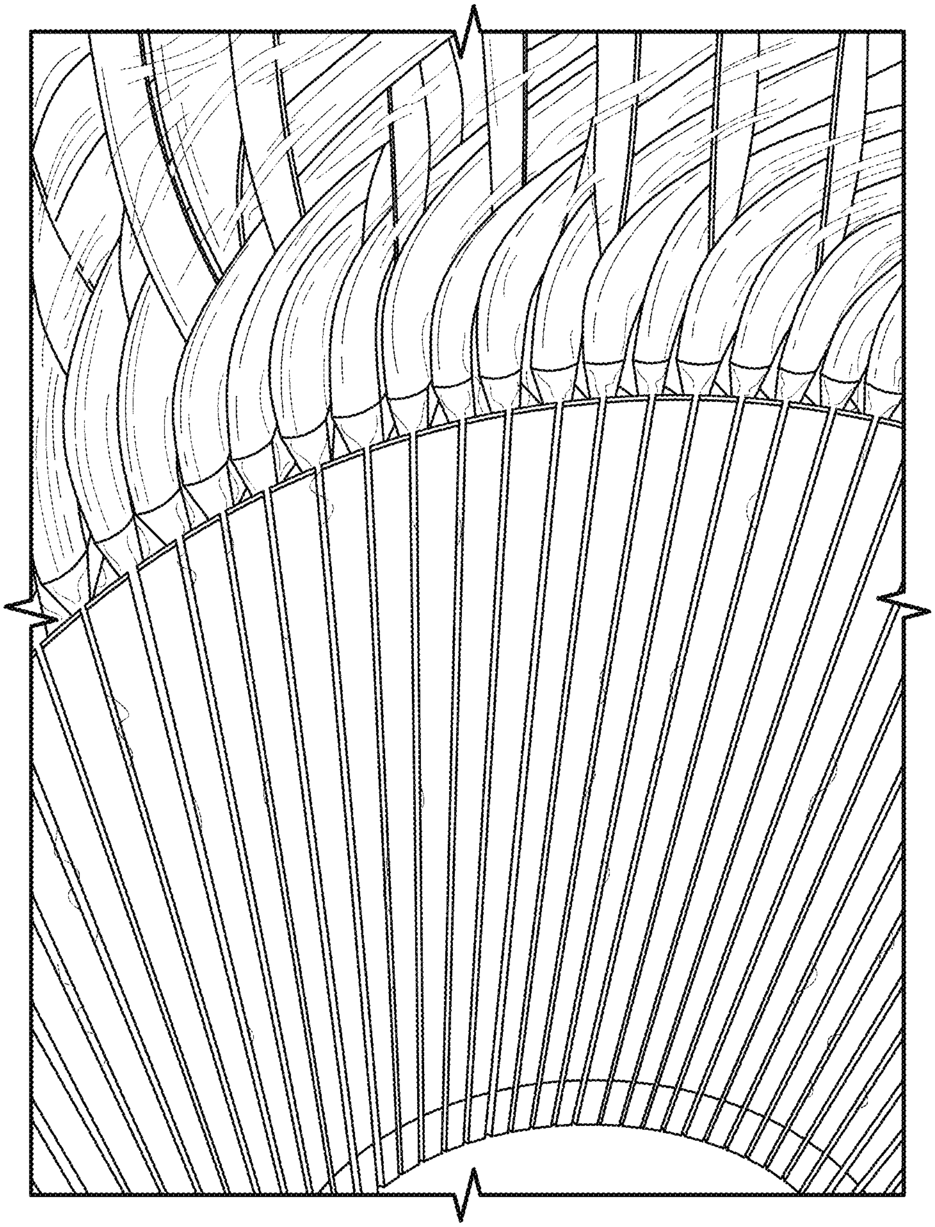
FIG. 2 illustrates a core section of the overheated original stator of FIG. 1

Overheating of stator windings result in long term insulation degradation, discoloration, and thermal stress issues due to high losses and/or insufficient cooling. FIG. 1 and FIG. 2 illustrate the impacts of overheating on overhang sections and core sections of stator windings, respectively. Additionally, overheating may cause premature failure of generators due to insulation aging. For example, winding insulation degradation follows an Arrhenius curve, implying that for a 10 °C increase in absolute temperature, insulation life is halved, and conversely, for a 10 °C decrease in absolute temperature, insulation life is doubled. Examples describes herein for replacing stators provide for improved insulation, thereby reducing thermal stress.

Figure 3:
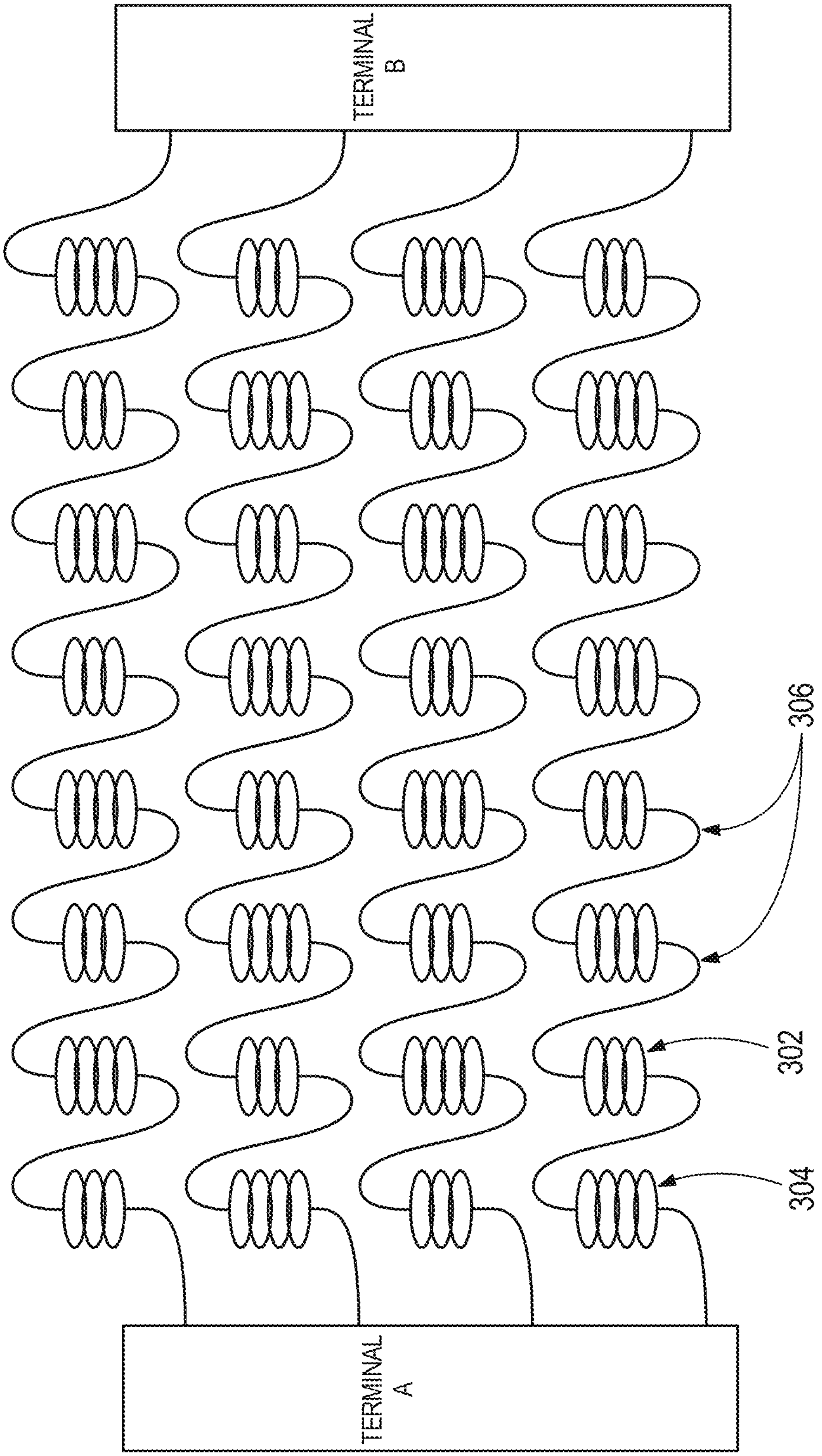
FIG. 3 illustrates a single phase of a winding configuration for an example original stator.
Figure 4:
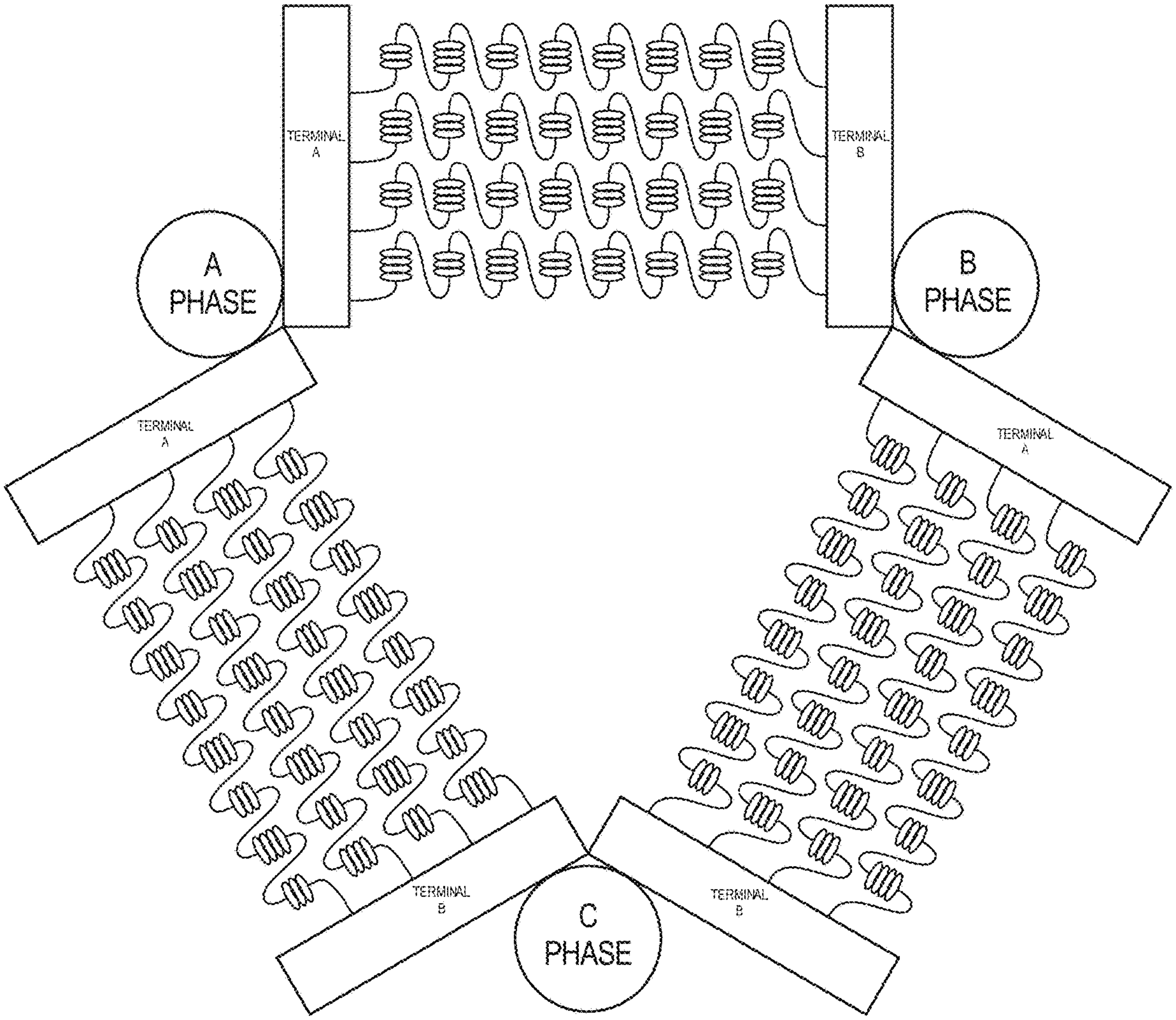
FIG. 4 illustrates three phases of a winding configuration for an example original stator.

The original stator winding is a four-circuit delta connection winding with three and four turns per coil. The stator consists of 96 stator slots, and thus with the 4 circuit delta connections, consist of 12 groups of 8 coils each for the entire winding. Each phase thus consists of (12/3 phases=) 4 groups of 8 coils per phase. However, these 8 coils per group are not uniform. Rather, the coils alternate between 3 turns per coil 302 and 4 turns per coil 304 connected at top-to-bottom connections 306, as represented in FIG. 3. FIG. 3 shows an example of 4 parallel groups of 8 coils per group of one phase. The complete winding with 4 parallel groups of 8 coils per group per phase is shown in FIG. 4. In each of the 96 slots of the stator there is thus one coil with 3 turns per coil, and one coil with 4 turns per coil, giving 7 total turns per slot.

The stator winding has significant stator copper losses as a result of eddy and circulating currents (as calculated in Table 1). As the stator winding has less than five turns per coil, the stator winding has decreased efficiency, increased winding temperature, reduced insulation life, and reduced wind generator power output. As shown below in Table 3, at least three different stator winding configurations were uncovered in existing stators.

TABLE 3

Winding Design Configuration Comparison

| Description | | Design 1 | Design 2 | Design 3 | Unit |
|---|---|---|---|---|---|
| Winding Configuration | Turns per coil | 3 & 4 | 4 | 3 & 4 | turns |
| | Conductors | 11x AWG16 and 17x AWG17 | 10x AWG16 and 14x AWG 15 | 17x AWG 15 and 9x AWG 16 | |
| Calculated Slot Fill Factor | | 42% | 54% | 52% | |
| Current density | | 2.78 | 2.15 | 2.23 | A/mm$^2$ |

In the first pre-existing design (Design 1), the calculated slot fill factor is in the slightly lower than the normal expected range of 43 to 49% and indicates to a winding that has a relatively "empty" slot fill, but probably suitable for automated machine winding. The calculated stator core flux densities have already been shown in, in Table 2 for the 3 and 4 turns per coil winding configuration. Design 2 was deemed erroneous as it did not meet the rating plate performance. Design 3 uses the turn configuration of 3 & 4 turns per coil, but with different wire sizes than Design 1. The slot fill factor is unusually high at 52%, which would make practical winding of the coils into the slot extremely difficult. The fit of the coils into the slot, was found the be extremely tight, and would not be practical unless the insulation thickness is significantly reduced. This winding configuration will force a compromise on the stator slot and conductor insulation, which may result in electrical failures, thereby reducing the generator reliability, perhaps to mean time between failures of less than 7 years, as reported by the end user.

As previously identified, reducing losses, thus including the stator conductor losses would be desirable, since it would reduce the overall heating of the generator, resulting in increased insulation life and reliability. The increase in conductor area needs to however be practical without compromising the slot and conductor insulation. In the improvement of the present disclosure, the stator conductor size is increased, while still maintaining sufficient space for suitable conductor and slot insulation. This design is compared to the pre-existing design configurations in Table 4.

per coil. The additional eddy and circulating current losses associated with the stator winding of previous designs, as calculated in Table 1, result in 6% of additional stator losses. These losses result in increased overall losses, decreased efficiency, increased winding temperature, and reduced generator power output.

Figure 5A:
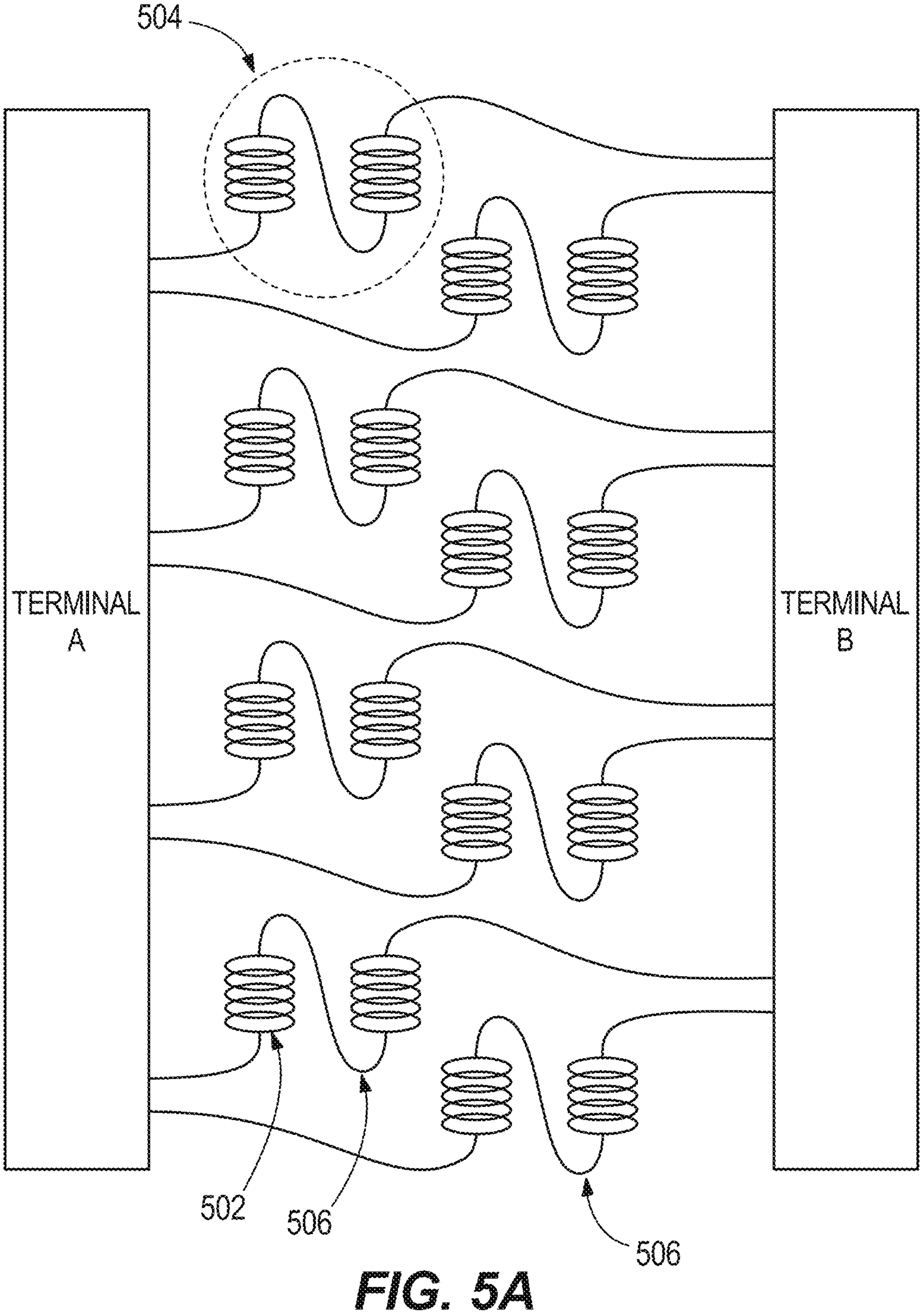
FIG. 5A illustrates a single phase of a winding configuration for an example replacement stator.
Figure 5B:
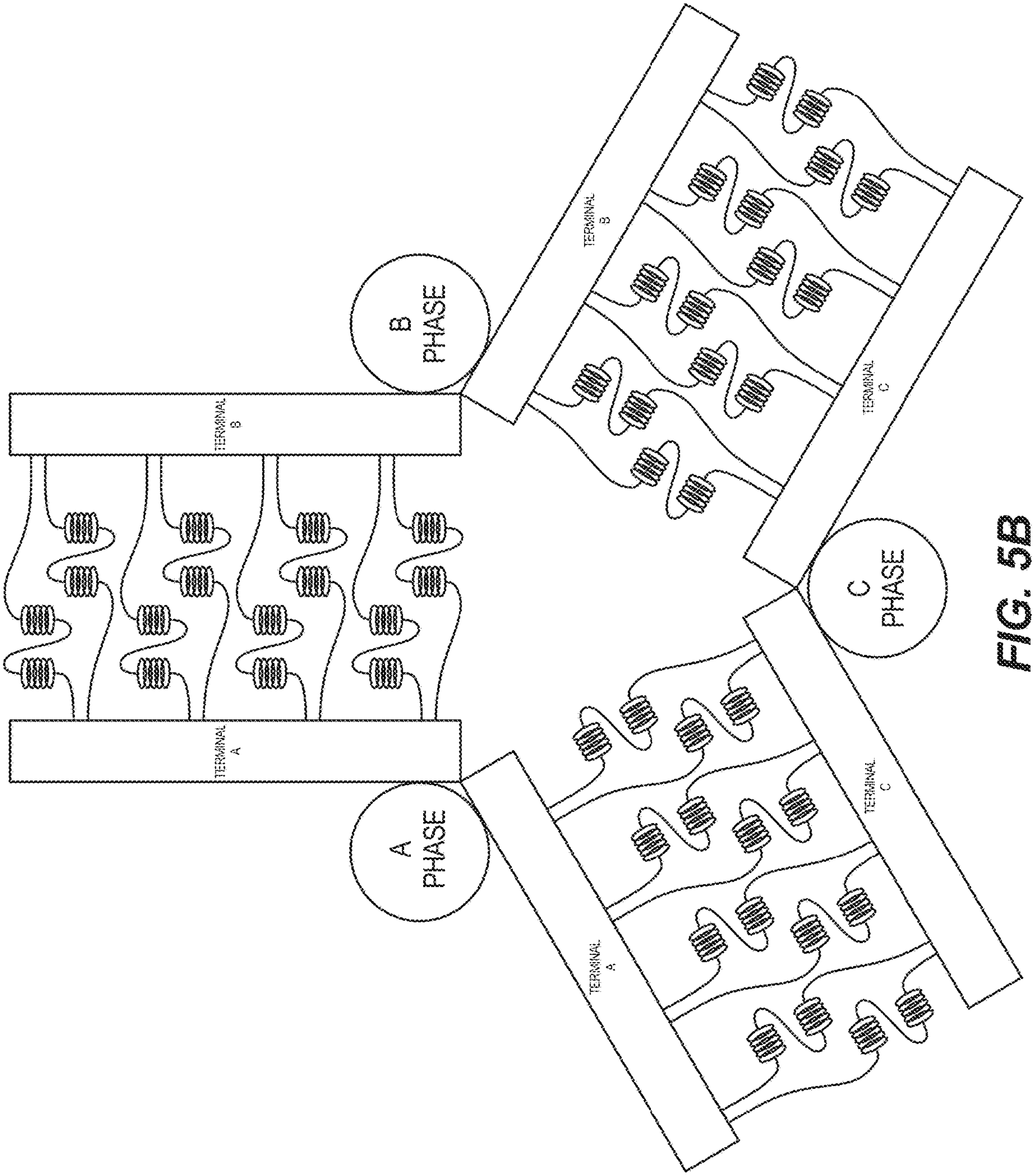
FIG. 5B illustrates three phases of a winding configuration for an example replacement stator.

The eddy and circulating current losses may be reduced by increasing the number of turns per coils and/or adding transpositions into the winding. For example, as shown in FIG. 5A, the stator winding may be replaced with a replacement stator winding connection having an eight-circuit delta connection (e.g., an interleaved winding) with seven turns per coil 502, with two coils 502 per group 504, and the coils 502 connected at top-to-bottom connections 506, thereby reducing the eddy and circulating current losses by 84.12% compared to the previous stator winding. The complete winding of the replacement stator winding connection is shown in FIG. 5B.

Replacing the stator winding connection with an eight-circuit delta connection increases the coil voltage from 82.4V per coil to 164.8V per coil. Accordingly, further insulation may be provided throughout the stator to account for the increase in voltage.

The insulation of conductors in previous stator windings is insufficient for even 82.4 V per coil, resulting in inter-turn failure and reduced generator life. Traditionally, conductor covering is selected based on the volt per turn. The calculated volt per turn for the previous stator is only 27.5 V, which is sufficient for as-stripped conductor insulation. However, since the original as well as the replacement stator design is a mush winding (e.g., random wound), it is not possible to guarantee that each turn is only adjacent to the subsequent turn, unless each turn is continuously wrapped in the respective slot (which is not possible due to slot opening size and available space for the insulation).

TABLE 4

Winding Design Configuration Comparison

| Description | | Design 1 | Design 3 | New Design | Unit |
|---|---|---|---|---|---|
| Winding Configuration | Turns per coil | 3 & 4 | 3 & 4 | 3 & 4 | turns |
| | Conductors | 11x AWG16 and 17x AWG17 | 17x AWG 15 and 9x AWG 16 | 28x AWG 16 | |
| Calculated Slot Fill Factor | | 42% | 52% | 48% | |
| Current density | | 2.78 | 2.23 | 2.43 | A/mm$^2$ |

The stator conductor losses are compared against Design 1 in Table 5.

TABLE 5

New Winding Design Stator Conductor Losses Comparison

| Description | | | Design 1 | New Design | Unit |
|---|---|---|---|---|---|
| Winding Configuration | | Turns per coil | 3 & 4 | 3 & 4 | Turns |
| | | Conductors | 11x AWG16 and 17x AWG 17 | 28x AWG | |
| Losses at Full Load | Stator | Conductor $I^2R$ | 4.707 | 3.845 | kW |

The design improvement reduces the stator contactor losses by 18.3%, which reduces the total generator losses and temperature rise and results in an increase in generator efficiency. Additionally, as only one conductor size is used, stock levels are reduced and winding manufacturing times are reduced. The improvements are achieved without compromising on the insulation that would result in reduced reliability.

As previously noted, the stator winding of previous designs is a four-circuit delta connection with 3 and 4 turns Example replacement stators described herein include upgraded conductor insulation to reduce inter-turn failures and increase reliability and life. For example, the conductors are upgraded to high conductivity, fully annealed (to increase conductivity, reduce losses and windability) copper with "quad film" insulation. The quad film insulation is capable of insulating these high voltages, reducing inter-turn failures and increasing reliability and life expectancy. Quad film wire is, for example, MW 35 Quad or MW 36 Quad as defined in the U.S. Standard NEMA MW 1000, where "quad" refers to the thickness of the coating on the wire.

Voltage stresses on the insulation between the conductors in the slot and the laminated core may increase the risk of a failure in the slot, which could cause significant damage to the core. When replacing the original stator, an aramid paper, polyimide film, aramid paper composite (for example, NKN 3-3-3) slot liner 300 may be added to the stator slots, shown in FIG. 6. The slot liner 300 may be 10 mil thick. The slot liner 300 provides voltage withstand up to 19,000 V and provides mechanical protection from sharp edges and protrusions from the laminated core and slots.

Figure 6:
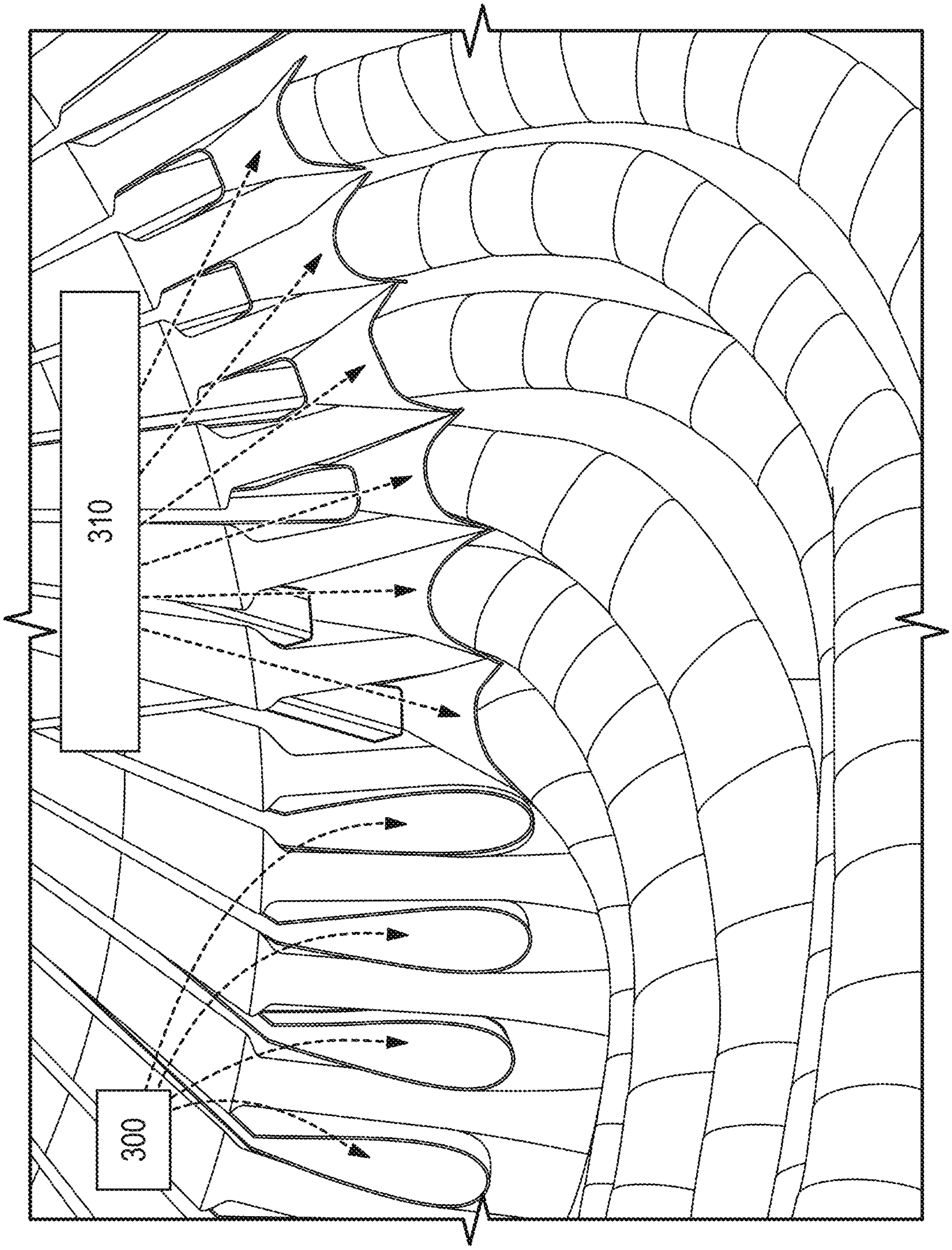
FIG. 6 illustrates an example stator winding of the present disclosure, including upgraded coil separators and slot liners.

Additionally, coil insulation between the top and bottom coils may be upgraded to an aramid paper, polyimide film, aramid paper composite (for example, NKN 5-5-5) slot liner 310 (for example, a coil separator), as shown in FIG. 6. The slot liner 310 may be 16 mil thick. The slot liner 310 provides voltage withstand up to 25,000 V.

Figure 7:
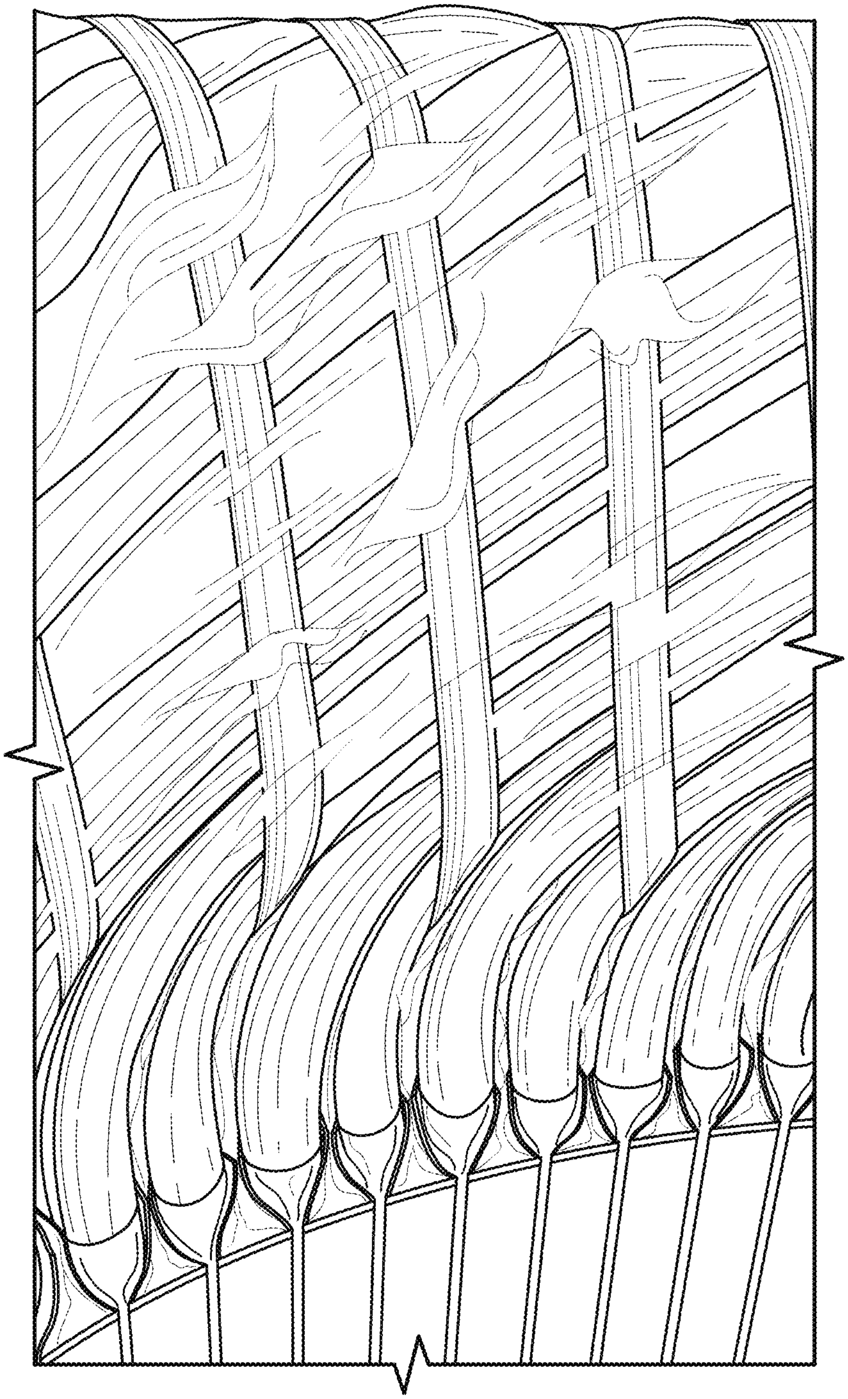
FIG. 7 illustrates the original stator of FIGS. 1 and 2, having no coil-to-coil insulation.
Figure 8:
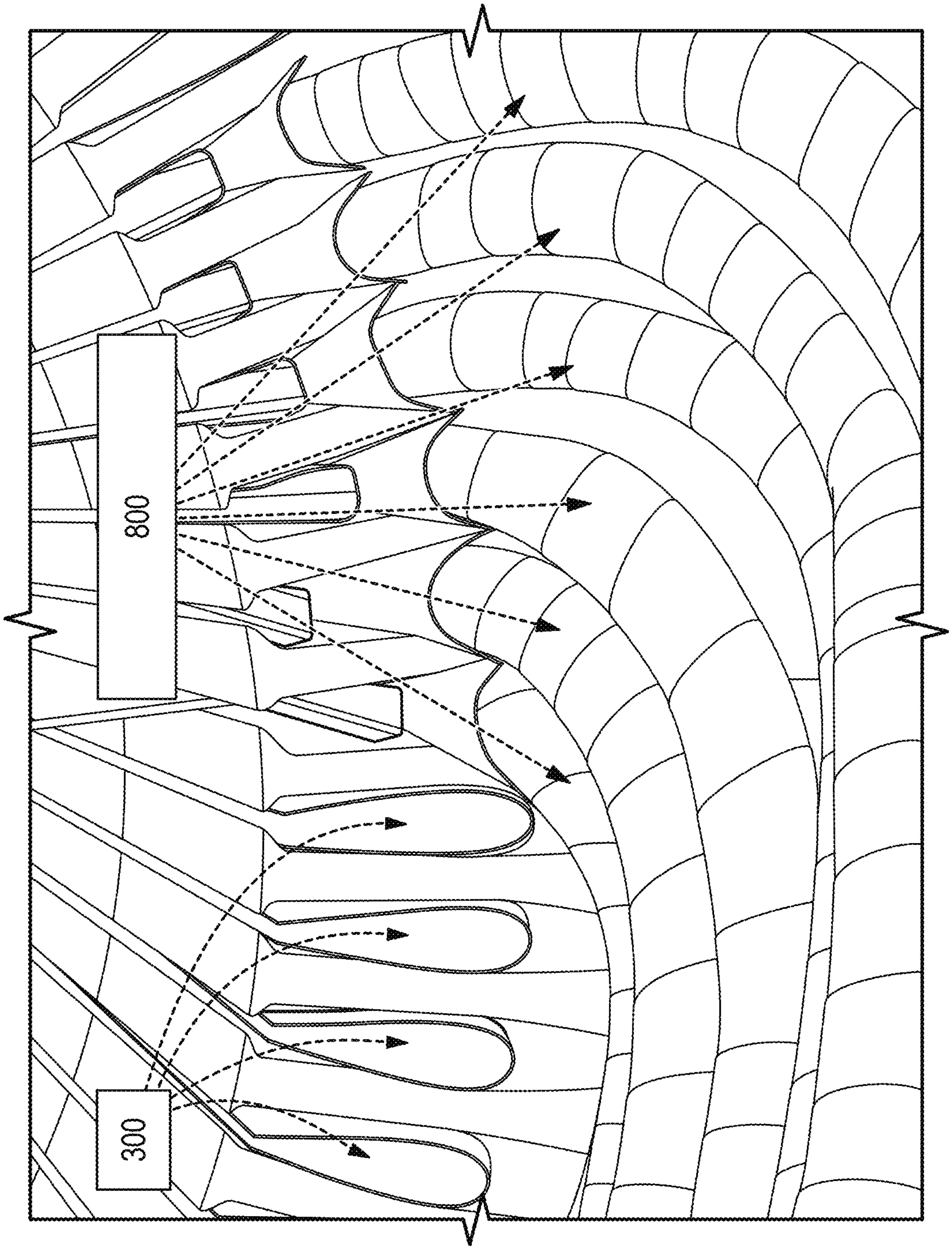
FIG. 8 illustrates the stator winding of the present disclosure, including overhang portions taped with porous glass tape.
Figure 9:
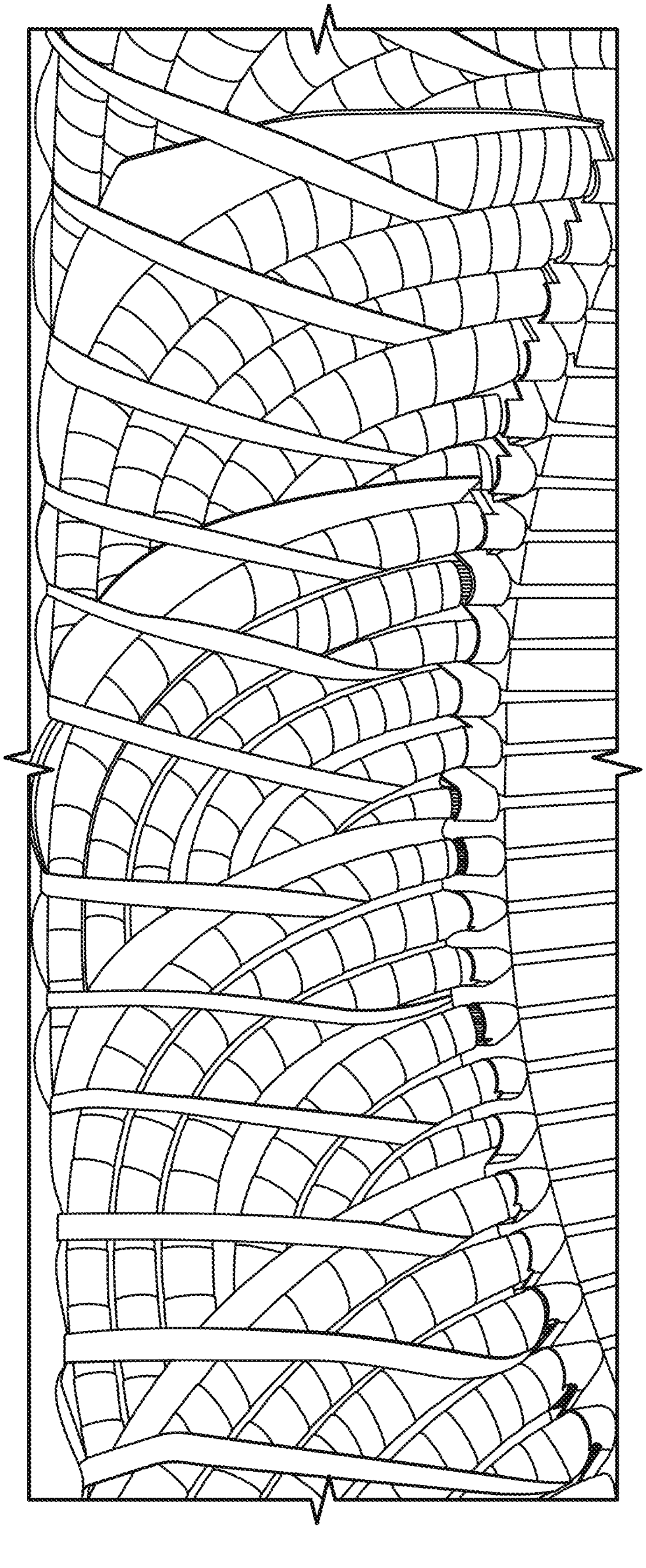
FIG. 9 illustrates an alternate view of the overhang portions of FIG. 8 taped with porous glass tape.

The stator coil-to-coil insulation in original stators, shown in FIG. 7, is non-existent. As the original winding design has a coil-to-coil voltage of approximately 164.4V, the lack of coil-to-coil insulation creates a risk of inter-coil failure on the overhang portion. To provide electrical insulation, each coil end on the overhang portion is taped (at taped coil end 800) with porous glass cloth or tape during repair and/or replacement of the stator, shown in FIGS. 8-9. Since the glass cloth or tape is porous, it soaks in and retains the insulating resin (being epoxy, polyester or silicon based resin), as impregnated during a Vacuum Pressure Impregnation (VPI) process, provides electrical insulation, and provides a mechanical bond and overhang strength for the overhang portions.

Figure 10:
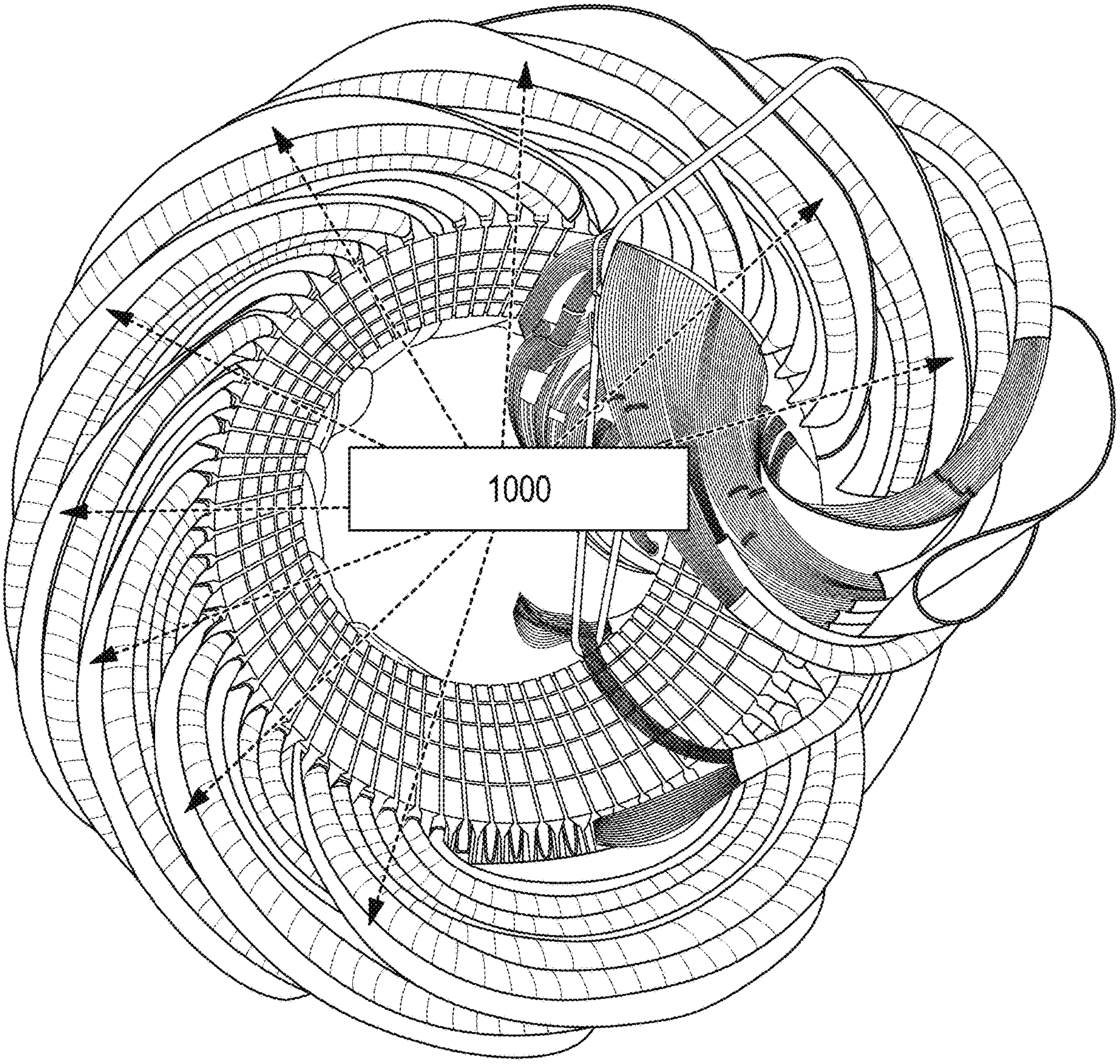
FIG. 10 illustrates the stator winding of the present disclosure, having phase separators.

The winding configuration implemented by original stators, as previously described, increases the risk of interphase failure on the overhang. When replacing the stators, the replacement stator winding may be wound with phase-to-phase separators 1000, shown in FIG. 10, using a polyester coated closed weave fabric (with a 180 °C thermal capability, good flexibility and tear strength, and high tensile strength), aramid paper, or composites of aramid and polyimide film. The separators add additional phase protection exceeding 1100V.

Replacement stators described herein experience an increased voltage withstand of each part of the insulation compared to previous stators, as shown below in Table 6.

TABLE 6

Voltage Withstand Comparison

| | Original Withstand | Replacement Withstand |
|---|---|---|
| Conductor Insulation | 5700 V | 10170 V |
| Coil Separator Insulation | 2300 V | 19000 V |
| Slot Insulation | 4520 V | 19000 V |
| Inter-Coil Insulation | 5700 V | 40670 V |
| Inter-Phase Insulation | 11400 V | 41770 V |

Rotor Replacement

Figure 11:
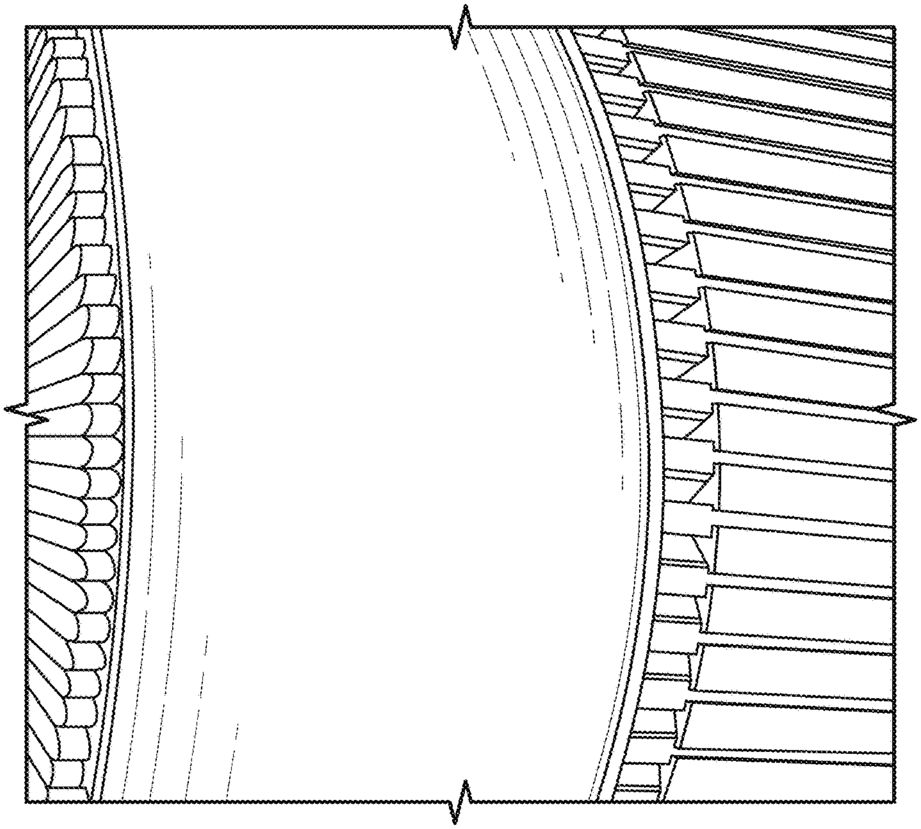
FIG. 11 illustrates a rotor winding of the original overheated machine.
Figure 12:
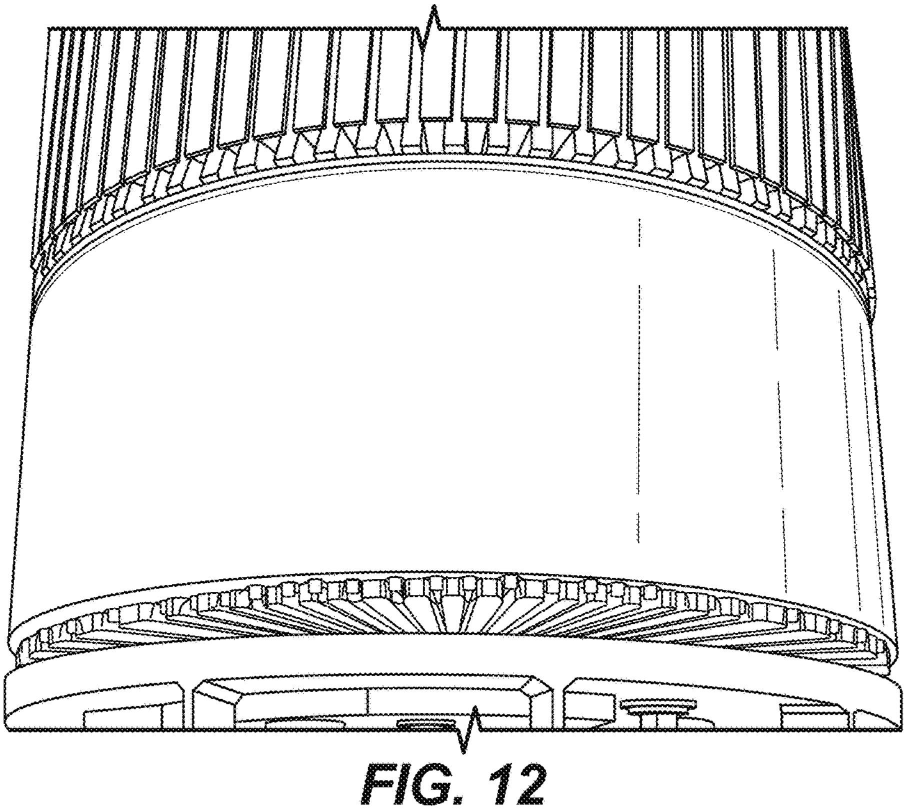
FIG. 12 illustrates another view of the overheated rotor winding of FIG. 11.

Rotors also experience overheating, as shown in FIGS. 11 and 12. Overall overheating of rotor windings indicate long term insulation degradation and thermal stress problems due to high losses and/or insufficient cooling. Overheating of the rotor may also cause premature failure of the machine due to insulation aging. Example replacement rotors and rotor repairs described herein provide for improved cooling of rotors. Additionally, reduced stator losses result in improved temperature control of the machine overall.

Figure 13:
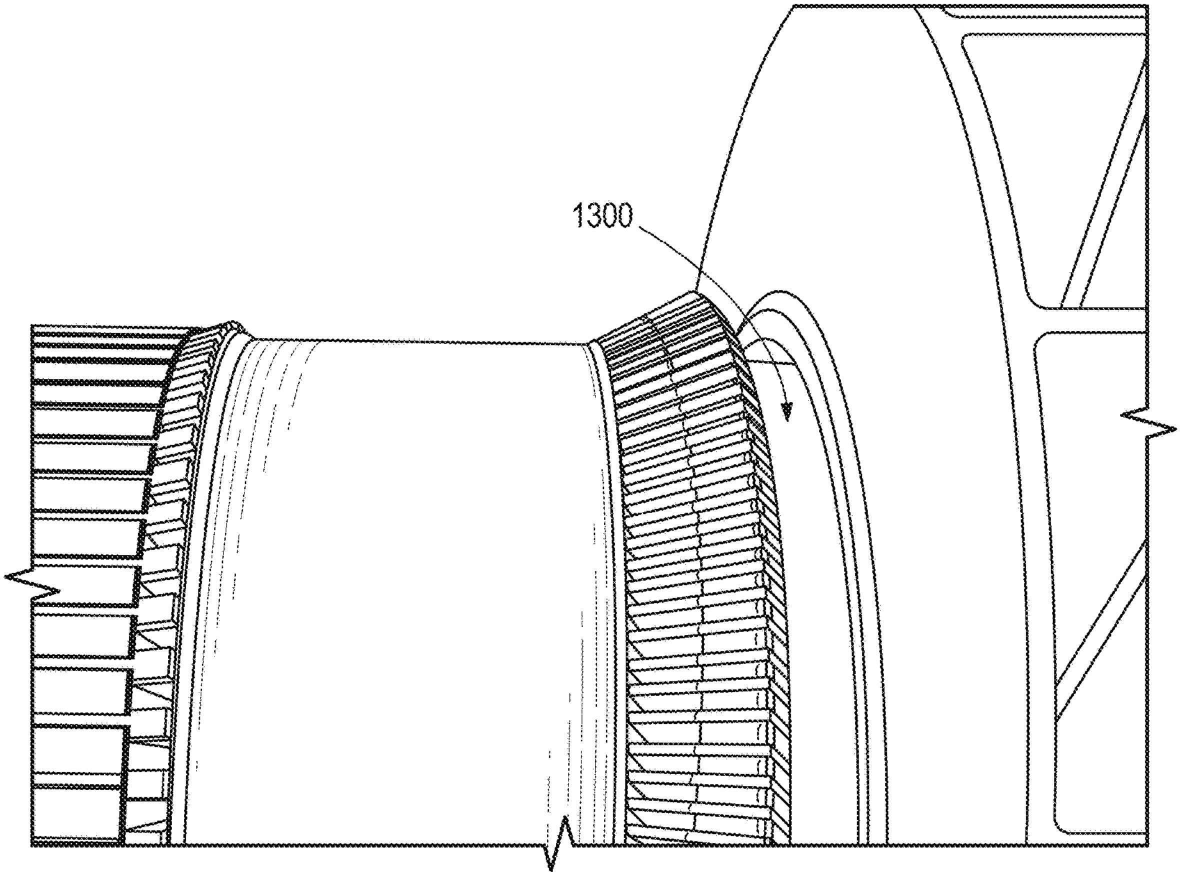
FIG. 13 illustrates an excessive clearance between the end of the rotor winding overhang and a shaft mounted fan air inlet on the original overheated machine.

As shown in FIG. 13, there is an excessive clearance 1300 between the rotor winding overhang and the fan on the opposite connection end of the rotor (e.g., where the internal shaft mounted fan is fitted). This clearance creates an air leakage path, reducing the air flow (due to air recirculation) and reducing the ability to extract heat from the machine. The clearance may be, for example, between 0.5 inches and one inch.

However, traditional manufacturing methods cut the rotor bars to length before they are wound into the rotor. If the rotor bars are too long, the overhang will touch the fan, creating a short circuit. Accordingly, manufacturers typically err on the side of caution, resulting in a large clearance gap and, therefore, a large leakage path for the air between the overhang end and the fan. As the length of rotor bars needs to be accurate to avoid the large clearance gap, manufacturing time of the rotor bars may be increased, as well as the time to wind them into the rotor.

Figure 14:
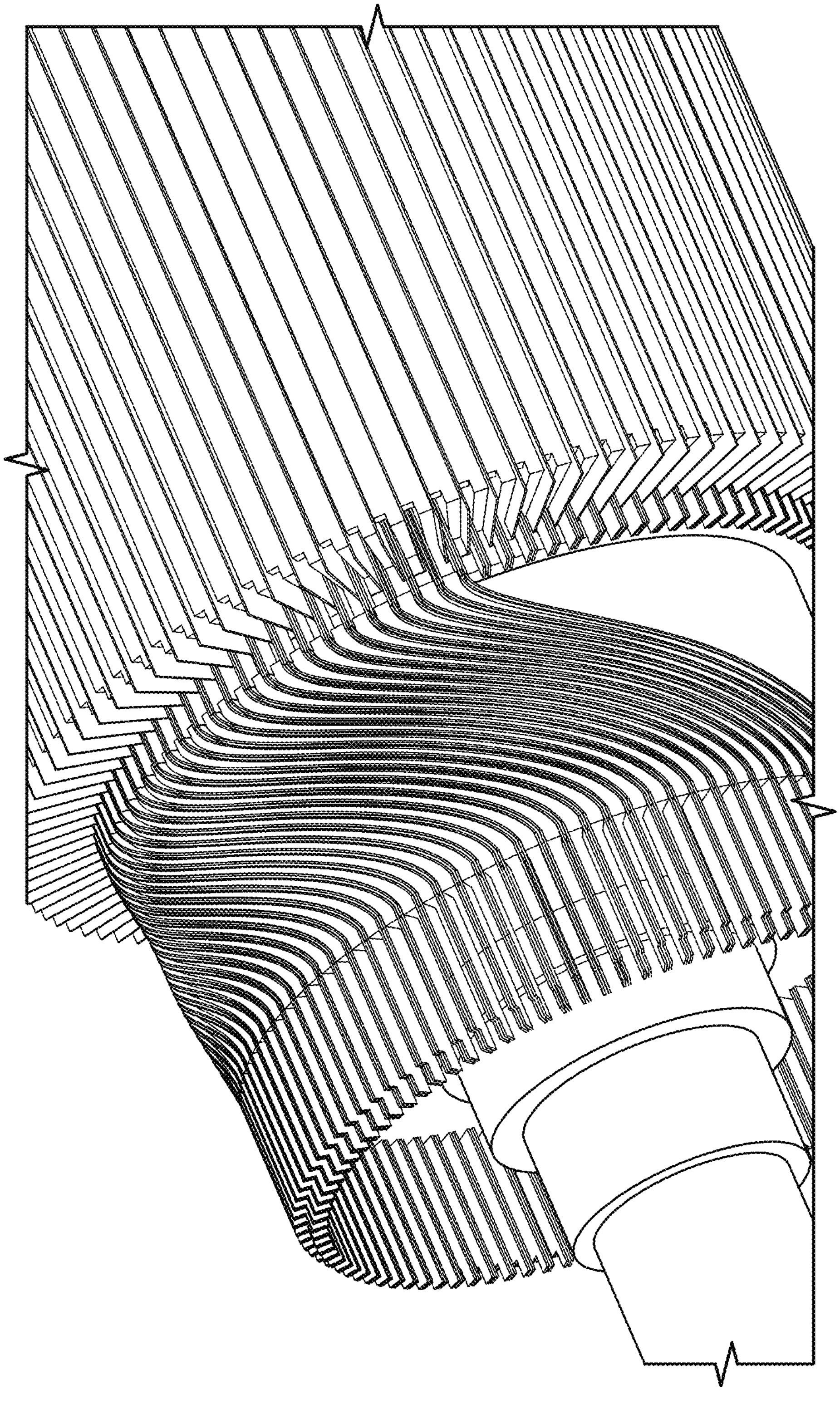
FIG. 14 illustrates the rotor winding of the present disclosure, having extended rotor bars wound into the rotor core.

Examples described herein replace the original rotor bars with longer rotor bars that are wound into the rotor core, shown in FIG. 14. As the tolerance on the rotor bar lengths can then be reduced, the manufacturing time of the bars and time to wind the rotor is also reduced.

Figure 15:
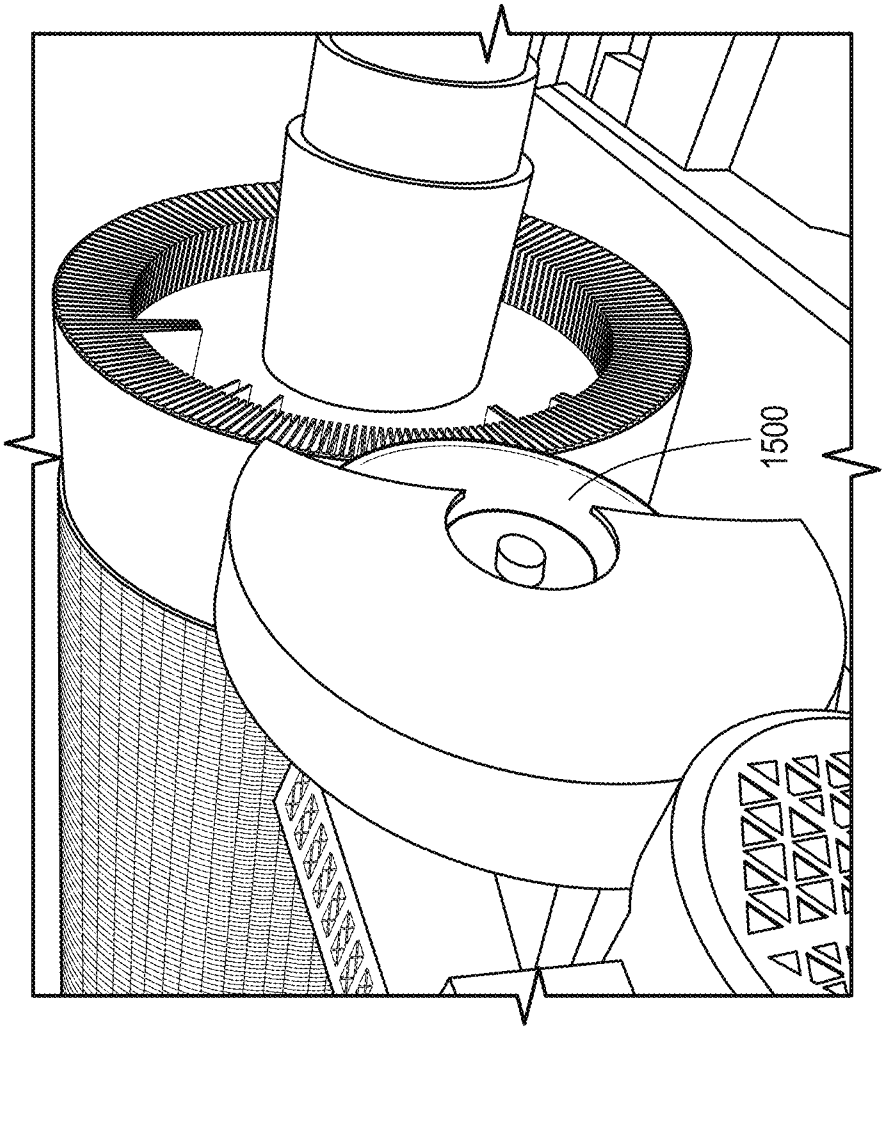
FIG. 15 illustrates a process of cutting the extended rotor bars to length after installation.

After winding and blocking, but prior to brazing the connections, overhang length may be measured and cut to the exact required length by mounting the rotor in a lathe and cutting the bars using a grinding disk. An example of cutting the bars is shown in FIG. 15. Usually, an abrasive disk is used. However, rotor bars are a soft metal and will load an abrasive wheel, causing increased heat and a decreased cut rate. A loaded wheel 1500, and especially a cutoff wheel, adds further pressure during cutting, as a user pushes harder during cutting to maintain the same cut rate, which may cause the wheel to break. Accordingly, an aluminum oxide disc may be implemented rather than zirconia or ceramic discs. The wheel may also be dressed using stone or brick.

Figure 16:
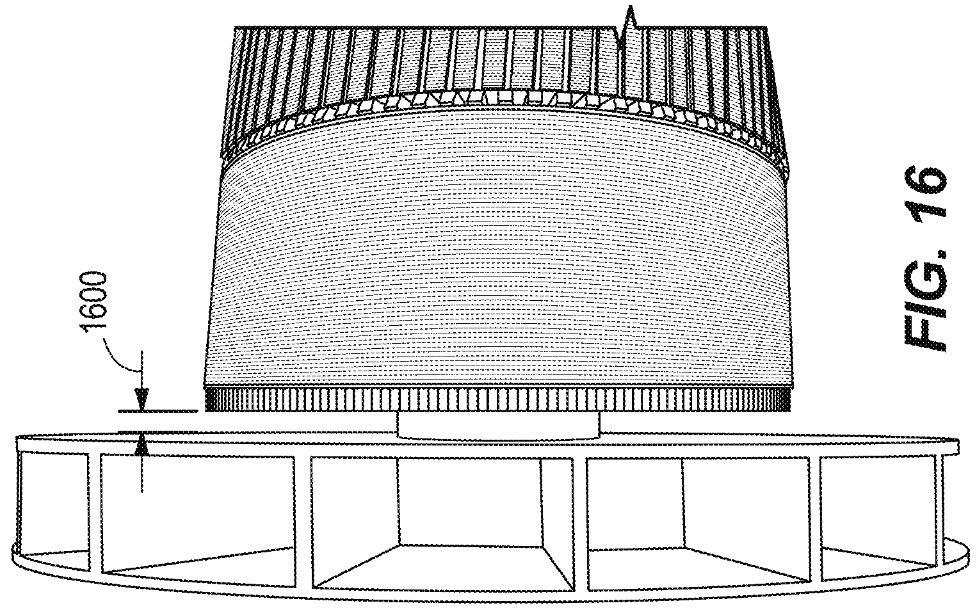
FIG. 16 illustrate a reduced clearance between the end of the rotor overhang and the fan inlet.

Manufacturing using the longer rotor bars that are wound into the rotor core and cut after winding and blocking reduces manufacturing times and rotor winding time while also controlling the distance between the end of the rotor overhang and the fan inlet. The reduced clearance 1600, shown in FIG. 16, may range between 0.3 in. and 0.5 in. The reduced clearance reduces air leakage while increasing the air circuit efficiency and the rotor's ability to remove heat.

Figure 17:
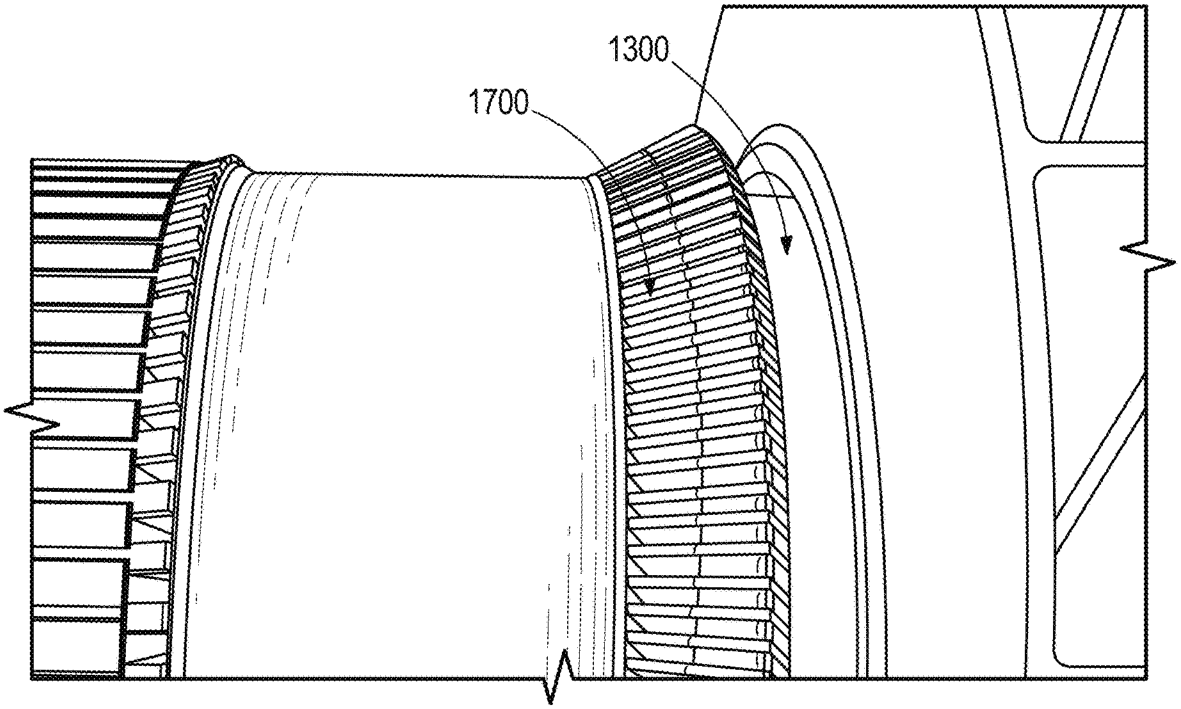
FIG. 17 illustrates the uncovered winding end of the original rotor acting as a fan that counteracts the internal fan.
Figure 18:
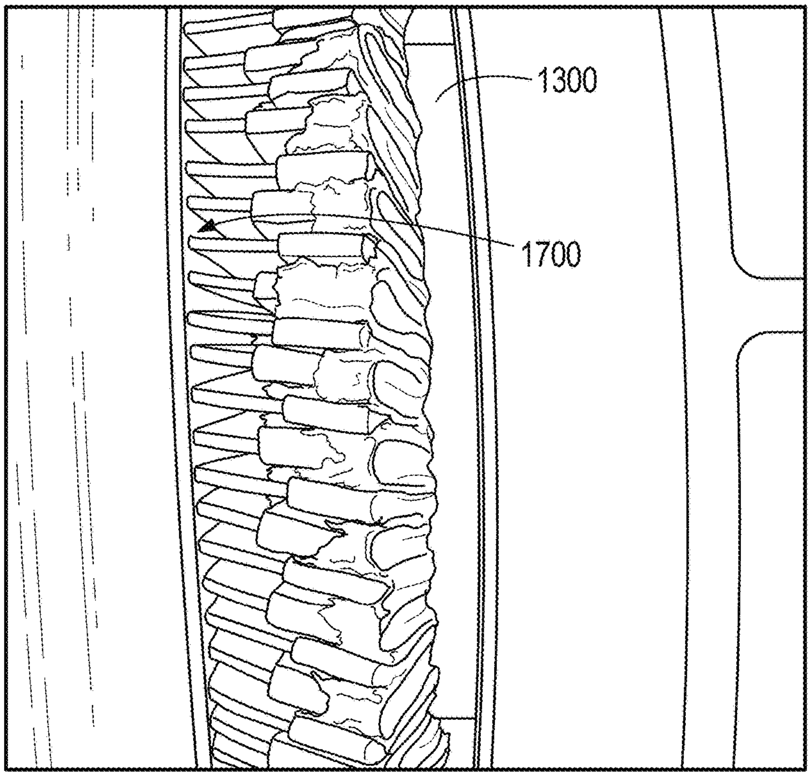
FIG. 18 is a close-up view of the uncovered winding end of FIG. 17.

Additionally, on the opposite connection end of the rotor where the internal shaft mounted fan is fitted, FIG. 17 shows banding on the overhang end 1700 that is not covered with banding tape. As one example rotor that includes 84 slots, the overhang end therefore creates a fan with approximately 168 fan blades (e.g., 84 slots and 168 bars). FIG. 18 shows a close view of the overhang end 1700. The overhang end thus acts as a counter-acting fan to the internal fan, reducing the fan air flow and thus reducing the ability to remove heat from the machine.

Figure 19A:
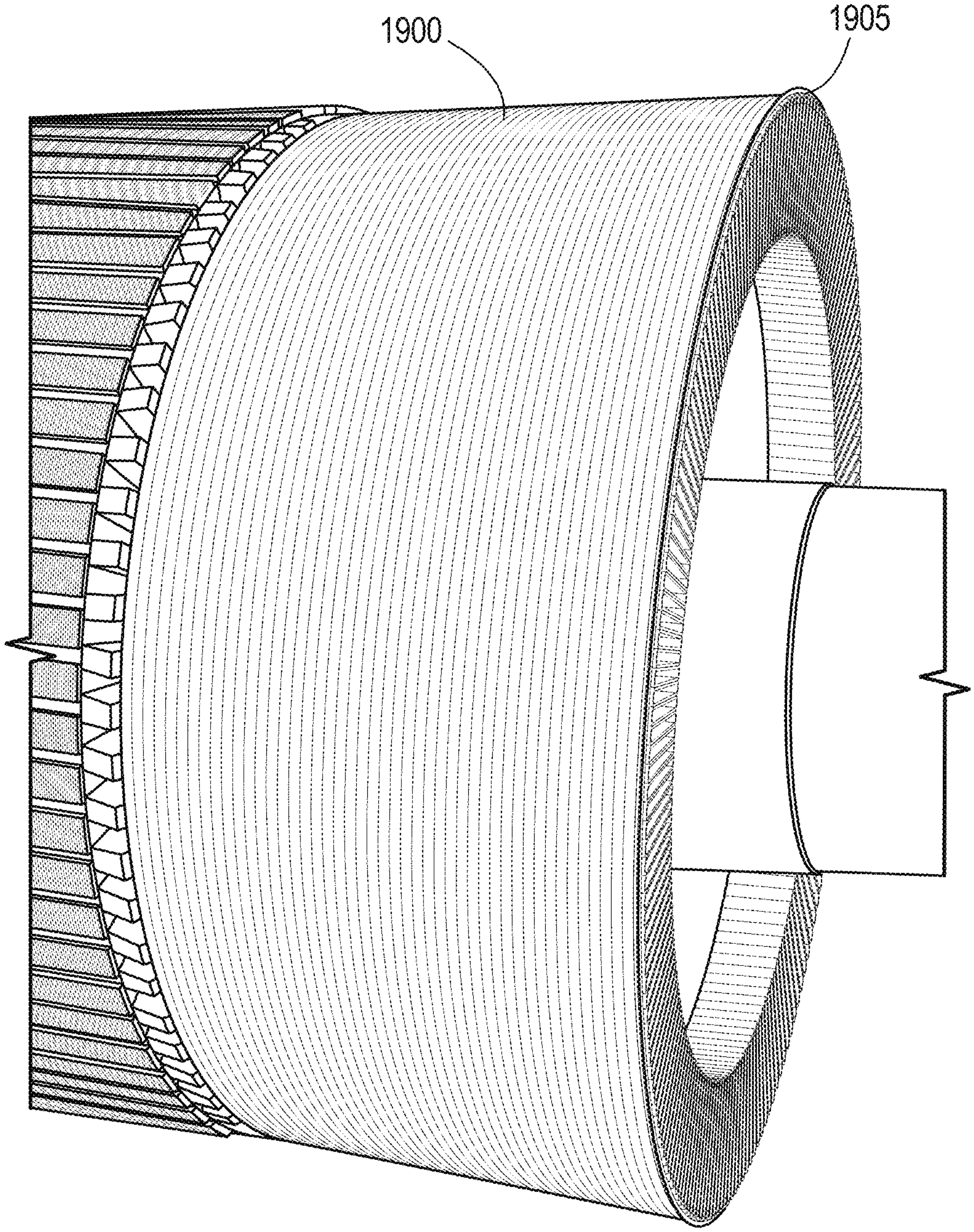
FIG. 19A illustrates a rotor overhang of the present disclosure, including a flanged woven glass mat supporting layers of banding tape.
Figure 19B:
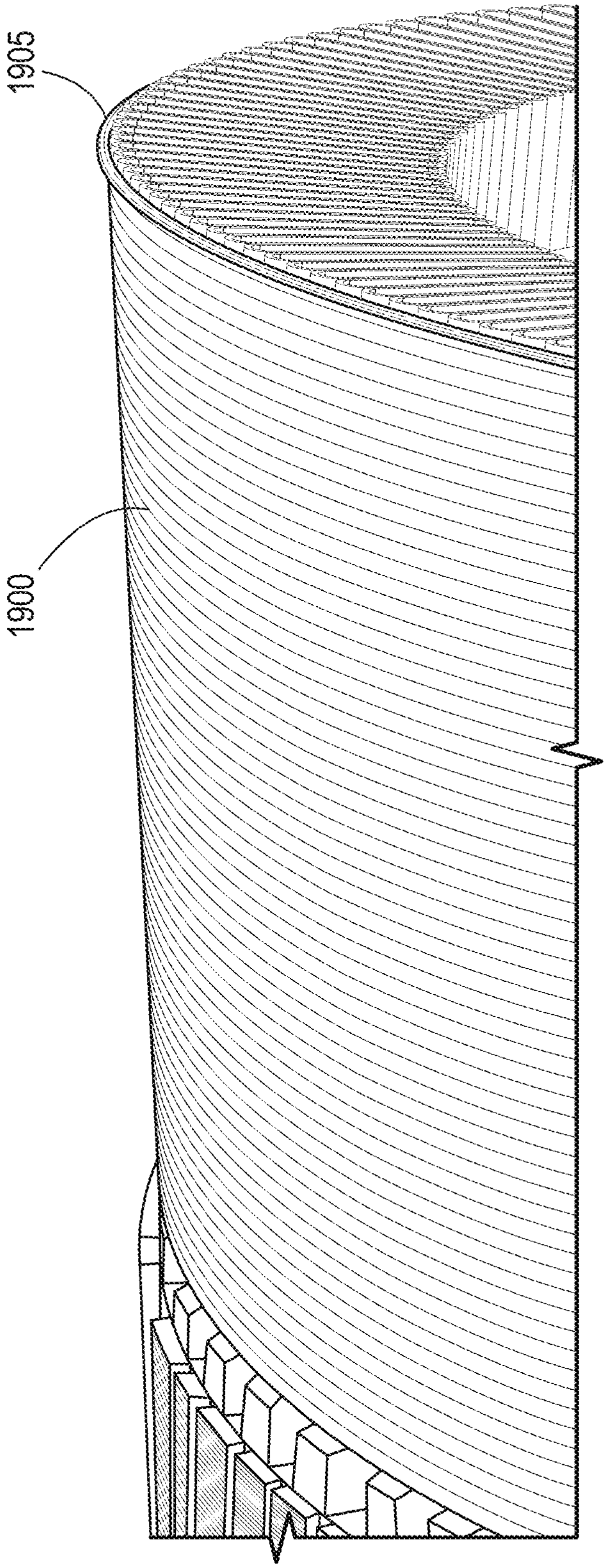
FIG. 19B illustrates an enlarged view of the glass mat of FIG. 19A.

Accordingly, during replacement of the rotor and before the rotor banding is applied, a woven glass mat 1900 may be wrapped around the radial outer perimeter (e.g., circumference) of the rotor. The woven glass mat 1900 may have a protuberant edge 1900 (e.g., radially projecting end flange) for the overhang banding tape to be wound up to and against. The protuberant edge 1900 assists with the overhang being covered to as close as practically possible (e.g., between 0.0625 in. and 0.250 in., or between 0.0625 in. and 0.125 in., such as 0.078 in.) to the edge of the overhang, shown in FIGS. 19A-19B. The woven glass mat 1900 in combination with overhang tape eliminates the overhang end acting as a counteracting fan to the internal fan. Additionally, the woven glass mat 1900 increases the total number of layers of banding tape that can be applied to the overhang, thereby increasing the strength of the overhang's resistance against centrifugal forces and the life of the machine. Specifically, while traditionally 65 layers of banding tape is used, the protuberant edge 1900 of the woven glass mat allows for application of at least 90 layers of banding tape to the overhang end, thereby increasing the strength of the overhang with 38% and thus increasing the durability and reliability of the rotor winding.

Figure 20:
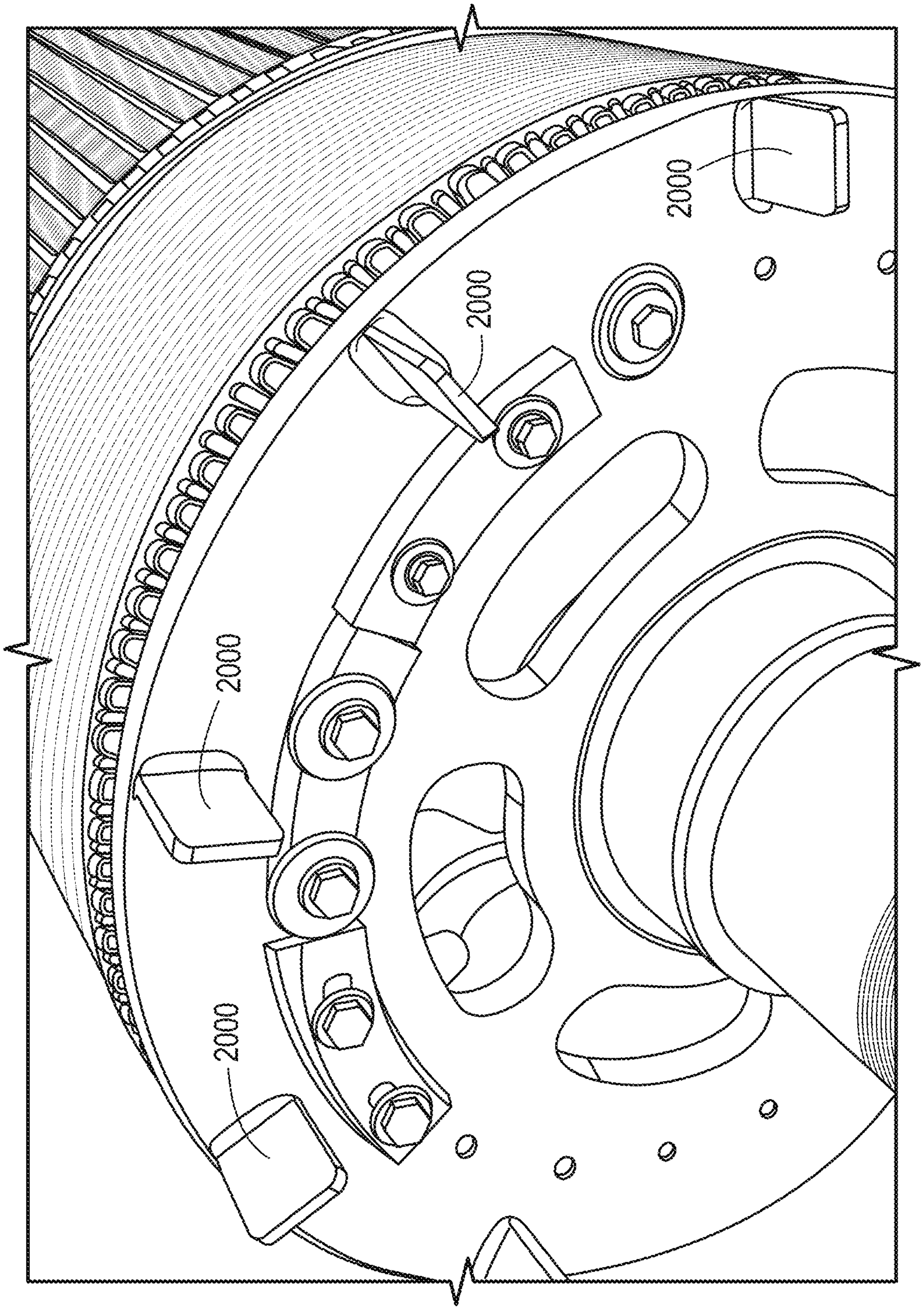
FIG. 20 illustrates a balancing disk of the original rotor, including a plurality of tabs in a peripheral portion.

As shown in FIG. 20, the original machine, on the connection end of the rotor, is fitted with tabs 2000 on the balancing disk. These tabs 2000 may be used for fixing balancing weights. The tabs 2000, however, also act as fans that counter-act the internal air that is sucked through axial shaft holes by the internal shaft mounted fan on the opposite connection end. Accordingly, the tabs 2000 reduce air flow of the internal fan and reduce the ability of the internal fan to remove heat from the machine.

Figure 21:
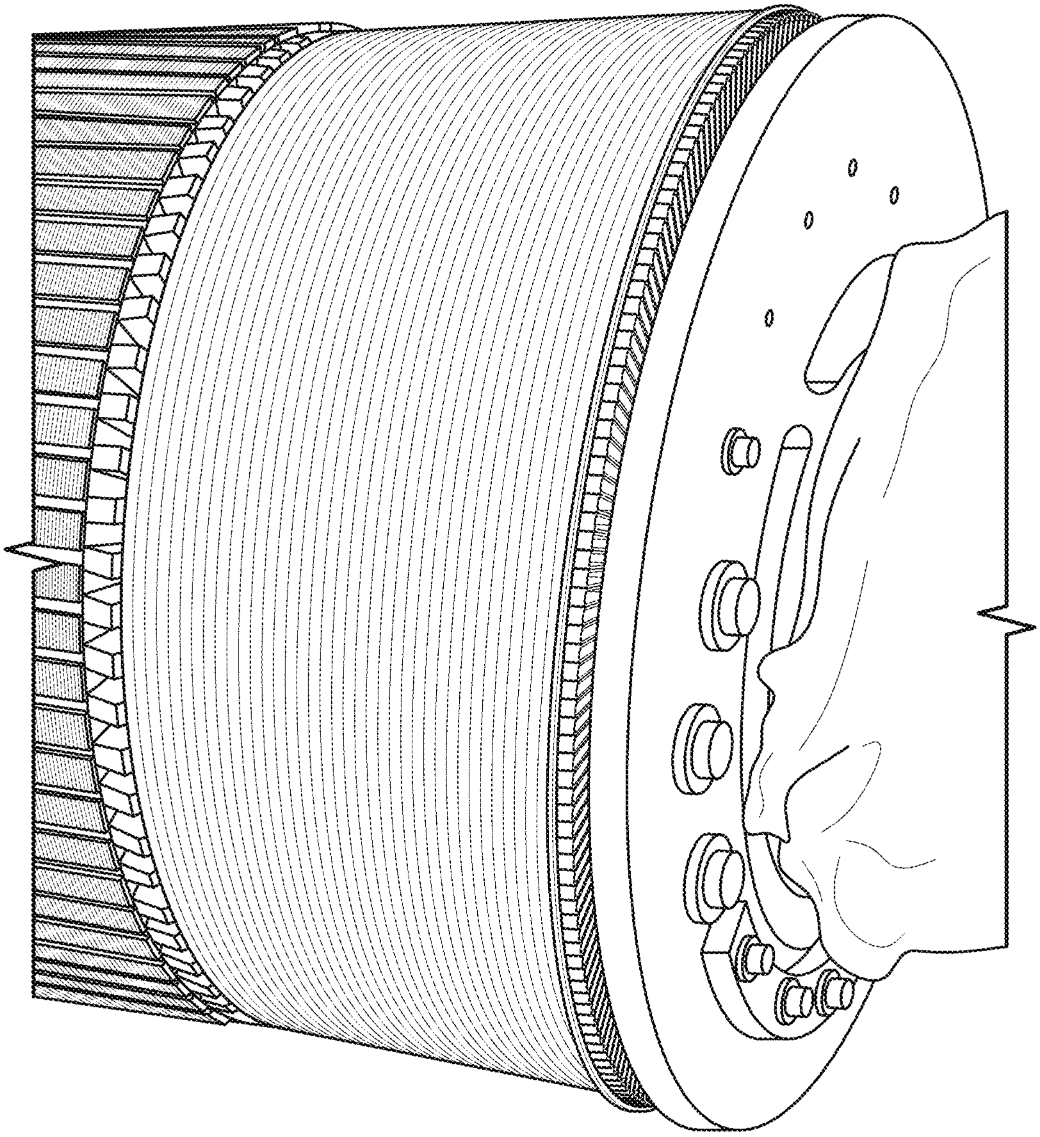
FIG. 21 illustrates a modified balancing disk in which the peripheral portion with the tabs is removed.
Figure 22:
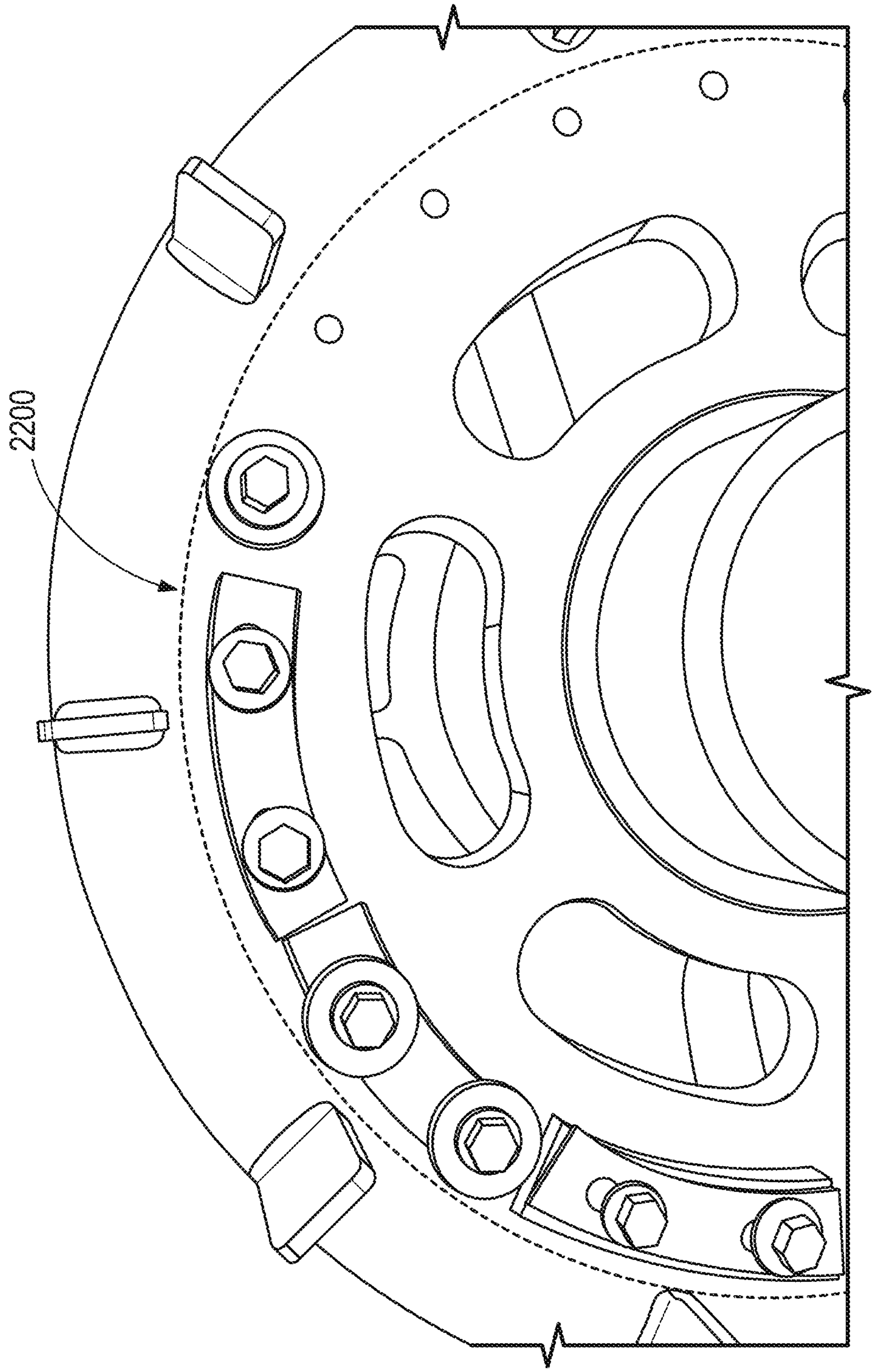
FIG. 22 is an end view of the balancing disk, schematically showing the boundary for removal of the peripheral portion.

In replacement rotors described herein, balancing of the rotor may instead be achieved by bolting balancing weights directly on the surface of the balancing disk itself, without using tabs. For example, as shown in FIG. 21, the tabs may be removed (for example, via grinding). Alternatively, as shown in FIG. 22, the balancing disk may be machined (e.g., cut) off just above the balancing holes (along dotted line 2200), eliminating the balancing tabs completely and reducing the outside diameter of the balancing disk. Removal of the tabs removes another counter-acting fan, thus increasing the internal air flow and increasing the cooling efficiency of the machine.

Figure 23:
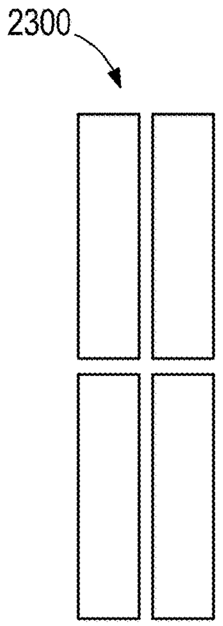
FIG. 23 illustrates a rotor bar configuration of the original rotor.
Figure 24:
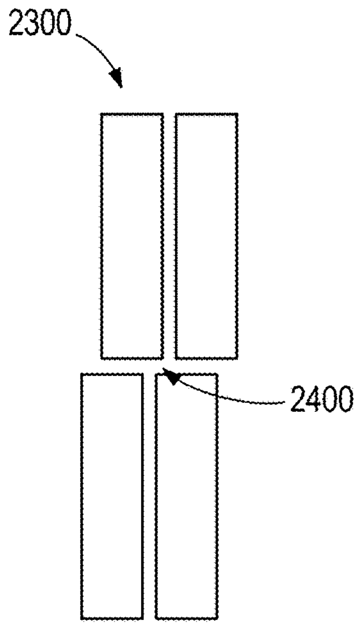
FIG. 24 illustrates a stack collapse scenario of the original rotor bar configuration of FIG. 23.

The original rotor winding consists of wave wound rotor bars, two conductors per slot, equally split into two (100 by 400 millimeter) copper bars 2300, as shown in FIG. 23. However, the original rotor bar configuration (four bars of equal size) has a risk of the stack collapsing due to the exact overlap of the center 2400 of the bars. FIG. 24 illustrates an example of the stack collapsing.

Figure 25:
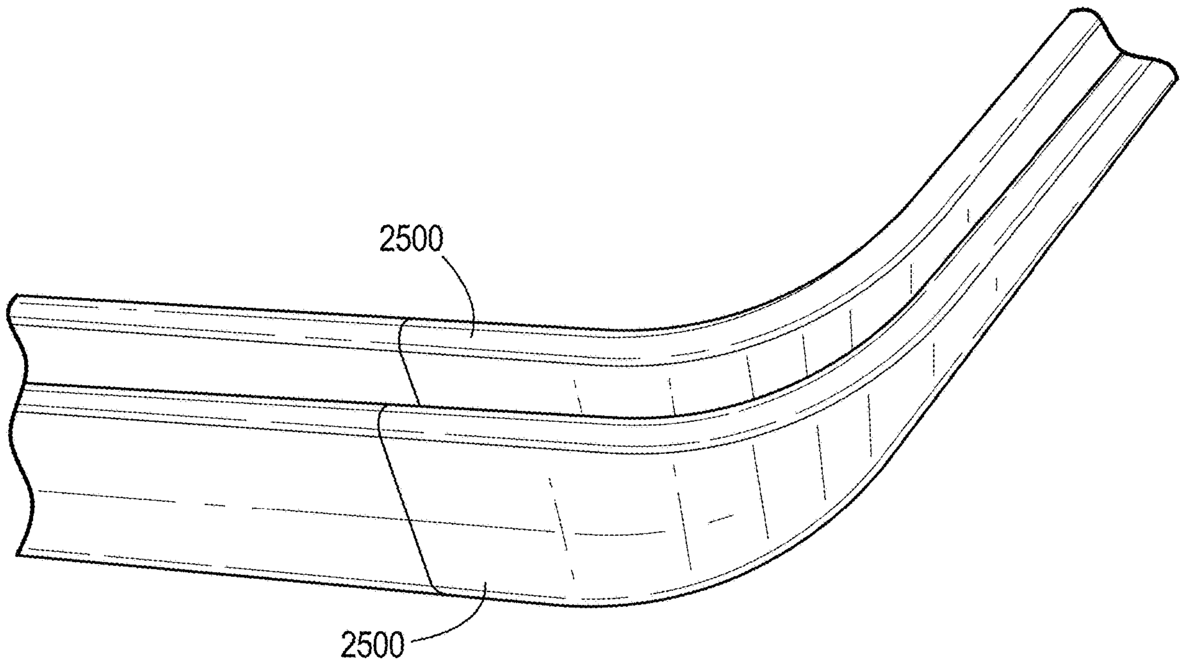
FIG. 25 illustrates an example of split rotor bars individually insulated.

As wind generators may operate with a wide range of operating speed and high frequency voltages, the collapsed stack may result in eddy current losses in the rotor winding due to deep bar and skin effect. Additionally, for some machines, the individual bars are insulated from each other to achieve a reduction in eddy currents. FIG. 25 shows an example of two rotor bars 2500 individual insulated from each other.

Figure 26:
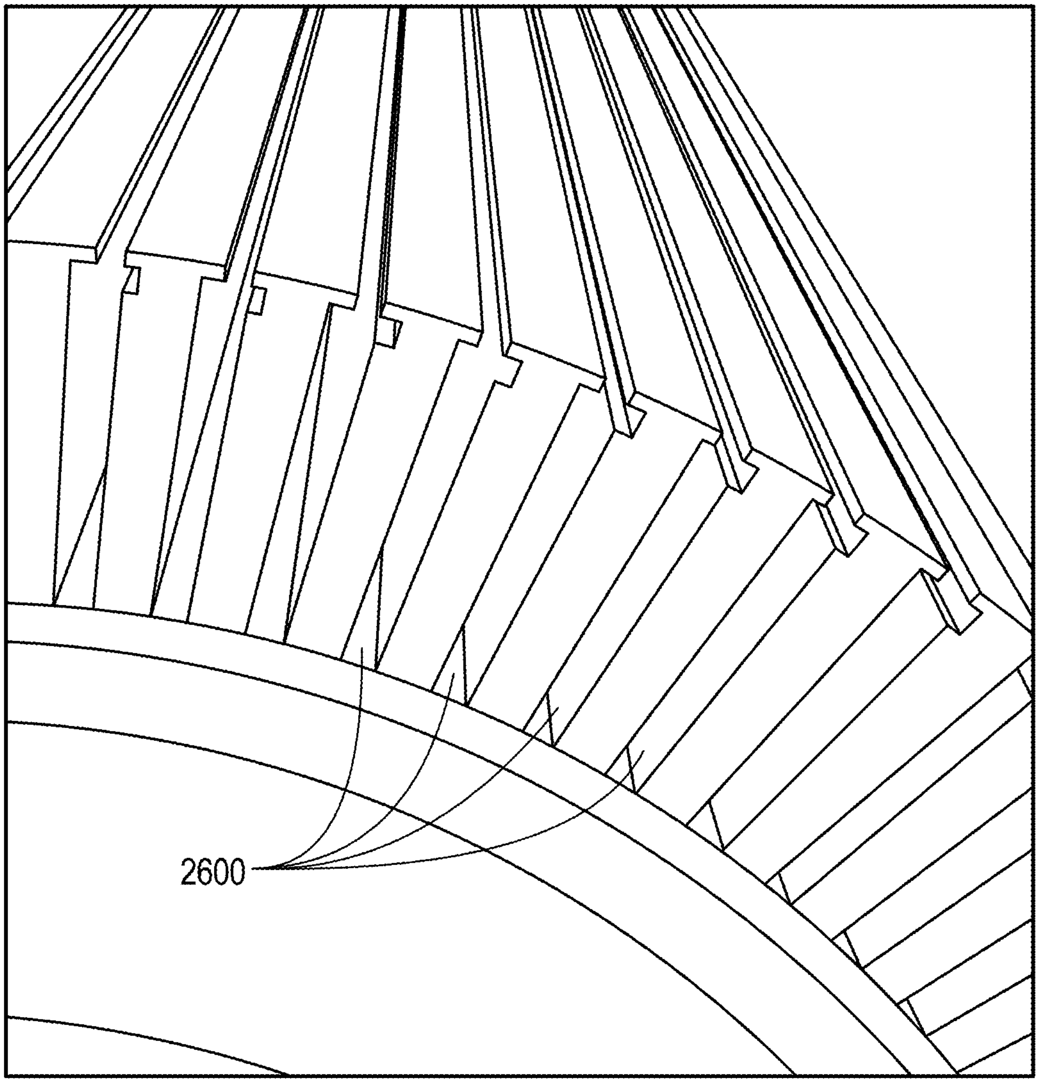
FIG. 26 illustrates the rotor core, including semi-closed rotor slots that make single bar insertion from the top (outside) impossible.

Accordingly, in replacement rotors, the four copper rotor bars may be combined into a single copper bar, eliminating the possible collapsing of the stack. Using a single copper bar increases the available space for turn and slot insulation. However, in some instances, the mechanical strength of the single rotor bar is less than a split bar. Additionally, as shown in FIG. 26, a single bar is not capable of being inserted from the top of the rotor slots 2600, and instead must be carefully inserted into the side of the rotor slots.

Figure 27:
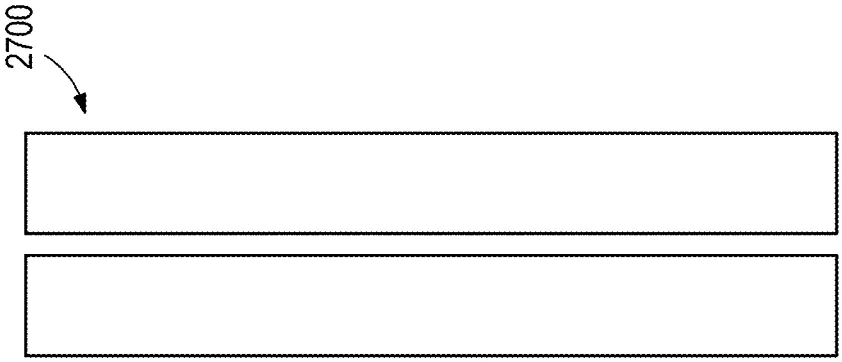
FIG. 27 illustrates one contemplated rotor bar stack, which is only split in the width direction to prevent collapse.

Accordingly, in another example replacement rotor, the rotor bars may be split into two (or more) conductors 2700, split in the width, as shown in FIG. 27. The use of two conductors also eliminates stack collapsing and works in the semi-closed rotor slots shown in FIG. 26. However, the split rotor bars shown in FIG. 27 may also be susceptible to eddy current losses in the rotor winding due to deep bar and skin effect.

Figure 29:
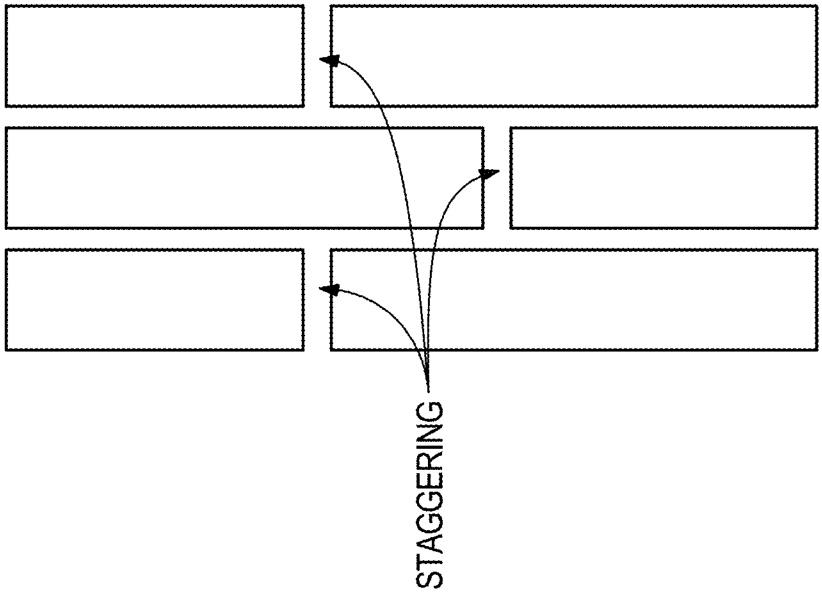
FIG. 29 illustrates another contemplated rotor bar stack, similar to FIG. 28, but with three rows of staggered bars.
Figure 28:
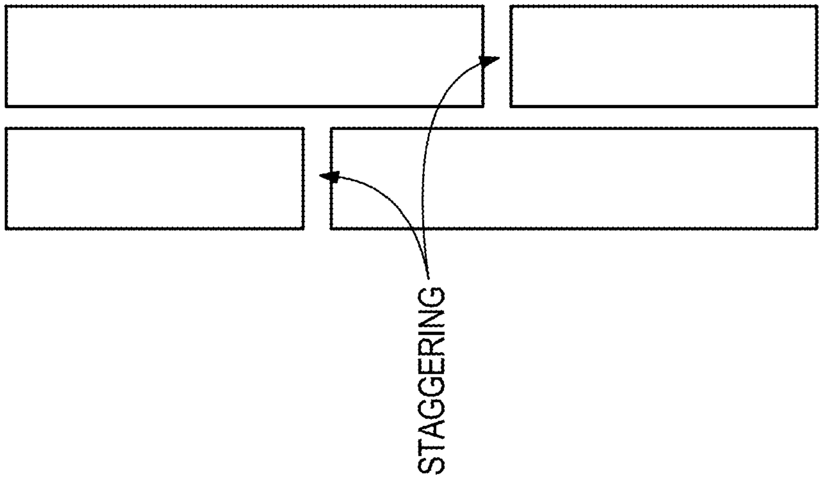
FIG. 28 illustrates another contemplated rotor bar stack, which uses unequal bar sizes to stagger the stack overlap.

In yet another example replacement rotor, rotor bars of different conductor sizes (e.g., different cross section profiles) may be staggered, as shown in FIG. 28. Depending on the overall bar area, the rotor bar may be split into more than two sections in width. For example, FIG. 29 shows a rotor bar configuration having three bars in the width. The use of staggered bars improves the mechanical strength of the stack while also removing the risk of a collapsed stack. In the replacement rotor, the overlap may be between one-eighth (⅛) inch and one-half (½) inch. Using a smaller overlap will reduce the mechanical strength and effectiveness of the overlap to prevent the collapsing of the stack.

For wind generators and other machines, the rotor voltage may be very high (e.g., greater than 1000 V). While this reduces the rotor current and the required size of conductors, the voltage stresses the insulation between the conductors in the slot and the laminated core has an increased risk of a failure in the slot. Accordingly, the rotor slot insulation in the replacement rotor may be an aramid paper, polyimide film, aramid paper composite slot liner (for example, NKN 3-3-3) that provides voltage withstand up to 19,000 V and provides protection from sharp edges and protrusions from the laminated core and slots. The slot liner may be, for example, 10 mil thick.

Embodiments of repairing and/or replacing a stator and/or a rotor for a wind generator described herein provide particular improvements on the reliability and lifespan of the stator and rotor while also achieving improvements in performance. Stators described herein include a slot fill that uses a total conductor area of between 43% to 49% of the available slot size. Table 7 provides a performance comparison between the original machine (e.g., Design 1) and the machine stator.

TABLE 7

Comparison between Original Machine Design and Replacement Machine Design

| | | Description | Original Design | Improved Design | Unit | % Change |
|---|---|---|---|---|---|---|
| | | Output Power | 660 | 660 | kW | |
| Losses | Stator | Conductor $I^2R$ | 4.707 | 3.845 | W | −18.30% |
| at Full | | Additional Eddy and | 6.00% | 6.00% | | |
| Load | | Circulating Current Losses | 0.267 | 0.231 | W | −13.59% |
| | | Total | 4.974 | 4.076 | W | −18.05% |

The designs and methods for constructing, installing, and/or refurbishing stators and rotors according to the present disclosure are particularly suitable for use in wind turbine generator applications. While examples described herein primarily refer to refurbishing stators and rotors, the features of rotors and stators described herein may also be utilized in the construction and manufacturing of new rotors and stators.

Various features and advantages of the aspects described herein are set forth in the following claims.

What is claimed is:

1. A method for refurbishing a stator for use in an electric machine, the method comprising:

accessing a plurality of stator windings connected in a four-circuit delta connection having three and four turns per coil and reconfiguring the plurality of stator windings such that the plurality of stator windings are connected in an eight-circuit delta connection having seven turns per coil, wherein the plurality of stator windings consists of only conductors that are insulated with quad film.

2. The method of claim 1, further comprising adjusting a size of the conductors such that a slot fill factor includes a total conductor area of between 43% to 49% of an available slot size.

3. The method of claim 1, wherein the plurality of stator windings are fully annealed copper windings.

4. The method of claim 1, wherein the plurality of stator windings are situated in stator slots lined with an aramid paper, polyimide film, aramid paper composite slot liner.

5. The method of claim 1, wherein each coil end of the plurality of stator windings on the overhang portion is taped with porous glass cloth or tape during refurbishing of the stator.

6. The method of claim 1, wherein the plurality of stator windings is wound with phase-to-phase separators, using an electrical insulation material.

7. The method of claim 6, wherein the electrical insulation material includes polyester coated closed weave fabric.

8. The method of claim 6, wherein the electrical insulation material includes aramid paper.

9. The method of claim 6, wherein the electrical insulation material includes composites of aramid and polyimide film.

10. The method of claim 1, wherein the stator includes 96 stator slots.

* * * * *